US009768501B2

(12) United States Patent
Maltsev et al.

(10) Patent No.: US 9,768,501 B2
(45) Date of Patent: Sep. 19, 2017

(54) APPARATUS, SYSTEM AND METHOD OF STEERING AN ANTENNA ARRAY

(71) Applicant: Intel Corporation, Santa Clara, CA (US)

(72) Inventors: Alexander Maltsev, Nizhny Novgorod (RU); Ali S. Sadri, San Diego, CA (US); Alexei Davydov, Nizhny Novgorod (RU); Vadim Sergeyev, Nizhny Novgorod (RU); Andrey Pudeyev, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 904 days.

(21) Appl. No.: 13/858,211

(22) Filed: Apr. 8, 2013

(65) Prior Publication Data

US 2014/0203969 A1      Jul. 24, 2014

Related U.S. Application Data

(60) Provisional application No. 61/754,712, filed on Jan. 21, 2013.

(51) Int. Cl.
*H01Q 3/00* (2006.01)
*H01Q 3/26* (2006.01)
(Continued)

(52) U.S. Cl.
CPC ............ *H01Q 3/2694* (2013.01); *H01Q 3/00* (2013.01); *H01Q 3/36* (2013.01);
(Continued)

(58) Field of Classification Search
CPC .. H01G 3/36; H01Q 3/00; H01Q 3/36; H01Q 3/2694
(Continued)

(56) References Cited

U.S. PATENT DOCUMENTS 3,996,590 A    12/1976  Hammack
5,162,803 A    11/1992  Chen
(Continued)

FOREIGN PATENT DOCUMENTS

EP    2262127    12/2010
RU    2050556    12/1995
(Continued)

OTHER PUBLICATIONS

International Search Report and Written Opinion for PCT Patent Application No. PCT/US2014/012202, mailed on Apr. 25, 2014, 12 pages.
(Continued)

*Primary Examiner* — Tashiana Adams
*Assistant Examiner* — Helena Seraydaryan
(74) *Attorney, Agent, or Firm* — Shichrur & Co.

(57) ABSTRACT

Some demonstrative embodiments include apparatuses, devices systems and/or methods of steering an antenna array. For example, an apparatus may include a baseband processor including a plurality of baseband processing chains to process signals to be communicated via a plurality of antenna modules of an antenna array, wherein the baseband processing chains include a plurality of frequency domain delay modules, a frequency domain delay module of the delay modules is to apply a time delay to a signal to be communicated via an antenna module of the plurality of antenna modules.

30 Claims, 10 Drawing Sheets

(51) Int. Cl.
*H01Q 3/36* (2006.01)
*H01Q 21/00* (2006.01)
*H04B 7/06* (2006.01)

(52) U.S. Cl.
CPC ....... *H01Q 21/0025* (2013.01); *H04B 7/0617* (2013.01); *H04B 7/0671* (2013.01)

(58) Field of Classification Search
USPC ........................................................ 342/375
See application file for complete search history.

(56) References Cited

U.S. PATENT DOCUMENTS

| | | | |
|---|---|---|---|
| 5,581,260 | A | 12/1996 | Newman |
| 5,923,289 | A | 7/1999 | Buer et al. |
| 6,823,174 | B1 | 11/2004 | Masenten et al. |
| 7,433,322 | B1 | 10/2008 | Alapuranen |
| 7,453,946 | B2 | 11/2008 | Sondur |
| 7,787,567 | B2 | 8/2010 | Sutskover |
| 7,884,776 | B2 | 2/2011 | Mohamadi |
| 8,630,362 | B1* | 1/2014 | von der Embse ............. H04L 25/03171 375/260 |
| 2004/0043795 | A1 | 3/2004 | Zancewicz |
| 2004/0235528 | A1 | 11/2004 | Korisch |
| 2005/0001784 | A1 | 1/2005 | Oliver et al. |
| 2005/0122257 | A1 | 6/2005 | Rowe et al. |
| 2006/0040615 | A1 | 2/2006 | Mohamadi |
| 2006/0220956 | A1* | 10/2006 | Richardson ........... G01S 7/2813 342/375 |
| 2007/0205955 | A1* | 9/2007 | Korisch ................. H01Q 1/246 343/853 |
| 2007/0210960 | A1 | 9/2007 | Rofougaran |
| 2007/0263748 | A1* | 11/2007 | Mesecher ............. H01Q 1/282 375/299 |
| 2007/0285312 | A1* | 12/2007 | Gao ...................... H01Q 1/246 342/367 |
| 2008/0150824 | A1 | 6/2008 | Weinstein |
| 2008/0181327 | A1* | 7/2008 | Lee ...................... H04B 7/028 375/267 |
| 2010/0328157 | A1 | 12/2010 | Culkin et al. |
| 2011/0064033 | A1 | 3/2011 | Gong et al. |
| 2011/0110340 | A1* | 5/2011 | Lakkis ................. H04W 74/08 370/336 |
| 2011/0291891 | A1 | 12/2011 | Nsenga et al. |
| 2012/0033761 | A1 | 2/2012 | Guo et al. |
| 2012/0034952 | A1* | 2/2012 | Lo ........................ H01Q 25/00 455/562.1 |
| 2012/0235881 | A1 | 9/2012 | Pan et al. |
| 2012/0256805 | A1* | 10/2012 | Orihashi ................ H01Q 3/30 343/853 |
| 2012/0280861 | A1 | 11/2012 | Kishimoto et al. |
| 2012/0309331 | A1 | 12/2012 | Yehezkely et al. |
| 2013/0027250 | A1 | 1/2013 | Chen |
| 2013/0059619 | A1 | 3/2013 | Kim et al. |
| 2013/0281029 | A1 | 10/2013 | Lee |
| 2013/0308717 | A1 | 11/2013 | Maltsev et al. |
| 2013/0322558 | A1* | 12/2013 | Harel ................... H04B 7/0417 375/267 |
| 2014/0203969 | A1 | 7/2014 | Maltsev et al. |
| 2014/0210666 | A1 | 7/2014 | Maltsev et al. |
| 2014/0357319 | A1 | 12/2014 | Maltsev et al. |
| 2015/0288438 | A1 | 10/2015 | Maltsev et al. |

FOREIGN PATENT DOCUMENTS

| | | |
|---|---|---|
| RU | 2357268 | 5/2009 |
| WO | 2014091274 | 6/2014 |
| WO | 2014098643 | 6/2014 |
| WO | 2014113755 | 7/2014 |
| WO | 2014116777 | 7/2014 |

OTHER PUBLICATIONS

International Search Report and Written Opinion for PCT Patent Application No. PCT/IB2012/003075, mailed on Aug. 15, 2013, 7 pages.
Wireless Gigabit Alliance (WGA) Specifications; WiGig MAC and PHY Specification Version 1.1, Apr. 2011—Final Specification; 442 pages.
IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.
IEEE Std 802.11ad™—2012. IEEE Standard for Information technology—Telecommunications and information exchange between systems Local and metropolitan area networks—Specific requirements Part 11: Wireless LAN Access Control (MAC) and Physical Layer (PHY) Specifications Amendment 3: Enhancements for Very High Medium Throughput in the 60 GHz Band, Dec. 28, 2012.
International Search Report and Written Opinion for PCT Application No. PCT/RU2012/001098, mailed on Sep. 19, 2013, 7 pages.
Office Action for U.S. Appl. No. 13/994,223, mailed on Aug. 7, 2015, 17 pages.
International Preliminary Report on Patentability and Written Opinion for International Application No. PCT/US2014/012202, mailed on Jul. 30, 2015, 9 pages.
Office Action for U.S. Appl. No. 13/994,223, mailed on Dec. 4, 2015, 13 pages.
Office Action for Taiwanese Patent Application No. 103101263, mailed on Oct. 22, 2015, 7 pages (including 1 page of English translation).
International Search Report and Written Opinion for PCT Patent Application No. PCT/US2014/012659, mailed on May 19, 2014, 12 pages.
Office Action for U.S. Appl. No. 14/126,516, mailed on Jul. 16, 2015, 34 pages.
Office Action for U.S. Appl. No. 14/126,516, mailed on Apr. 27, 2016, 33 pages.
Notice of Allowance for U.S. Appl. No. 13/994,223, mailed on Mar. 30, 2016, 7 pages.
Office Action for Taiwanese Patent Application No. 103101263, mailed on Nov. 10, 2016, 3 pages.

* cited by examiner

APPARATUS, SYSTEM AND METHOD OF STEERING AN ANTENNA ARRAY

CROSS REFERENCE

This application claims the benefit of and priority from U.S. Provisional Patent Application No. 61/754,712 entitled "Apparatus, System and Method of Steering an Antenna Array", filed Jan. 21, 2013, the entire disclosure of which is incorporated herein by reference.

TECHNICAL FIELD

Embodiments described herein generally relate to steering an antenna array.

BACKGROUND

Some wireless communication systems may communicate over the Millimeter wave (mmWave) frequency band, e.g., the 60 GHz Frequency band. A mmWave propagation has a few major distinctive features in comparison with lower frequency bands, e.g., the frequency bands of 2.4-5 GHz. For example, the mmWave propagation may have a propagation loss greater than the propagation loss in the lower frequency bands, and may have Quasi-optical propagation properties.

A mmWave communication system may use high-gain directional antennas to compensate for large path loss and/or employ beam-steering techniques. Design of appropriate antenna system and/or further signal processing may be an important aspect of mmWave communication system development.

Multi-element phased antenna arrays may be used, for example, for creation of a directional antenna pattern. A phased antenna array may form a directive antenna pattern or a beam, which may be steered by setting appropriate signal phases at the antenna elements.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
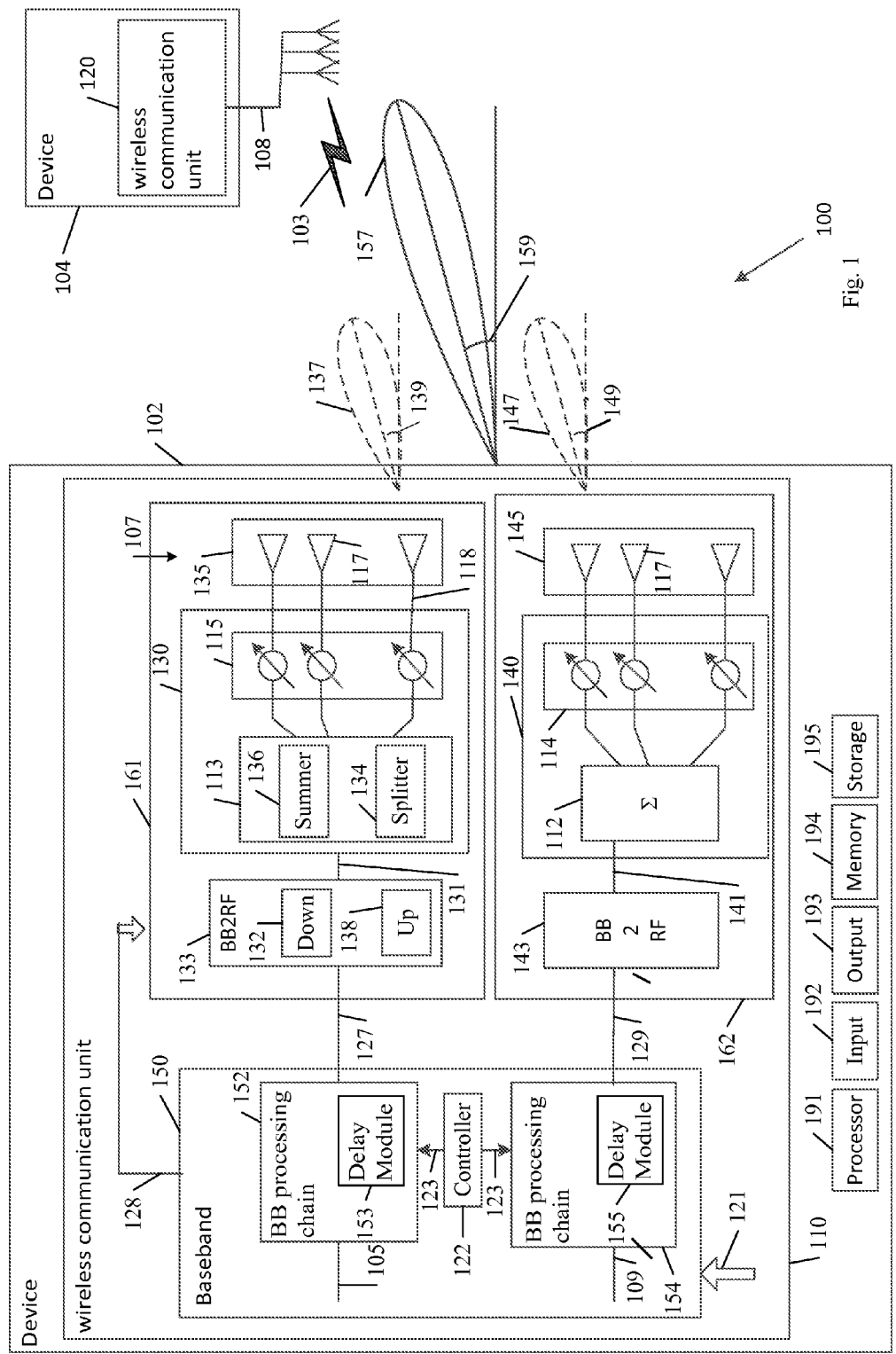
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Mar.* 29, 2012; *IEEE*802.11 *task group ac* (*TGac*) ("*IEEE*802.11-09/0308*r*12—*TGac Channel Model Addendum Document*"); *IEEE* 802.11 *task group ad* (*TGad*) (*IEEE P*802.11*ad Standard for Information Technology— Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications— Amendment* 3: *Enhancements for Very High Throughput in the* 60 *GHz Band*)) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 20 Ghz and 300 GHZ, a WLAN frequency band, a WPAN frequency band, a frequency band according to the WGA specification, and the like.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "mmWave frequency band" as used herein may relate to a frequency band above 20 GHz, e.g., a frequency band between 20 GHz and 300 GHz. The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the mmWave or DMG band.

The term "beamforming", as used herein, may relate to a spatial filtering mechanism, which may be used at a transmitter and/or a receiver to improve one or more attributes, e.g., the received signal power or signal-to-noise ratio (SNR) at an intended receiver.

Reference is now made to FIG. 1, which schematically illustrates a block diagram of a system 100, in accordance with some demonstrative embodiments.

In some demonstrative embodiments, system 100 may include a wireless communication network including one or more wireless communication devices, e.g., wireless communication devices 102 and/or 104, capable of communicating content, data, information and/or signals over a wireless communication link, for example, over a radio channel, an IR channel, a RF channel, a Wireless Fidelity (WiFi) channel, and the like. One or more elements of system 100 may optionally be capable of communicating over any suitable wired communication links.

In some demonstrative embodiments, devices 102 and/or 104 may include a wireless communication unit capable of communicating content, data, information and/or signals over at least one wireless communication link 103. For example, device 102 may include a wireless communication unit 110 and device 104 may include a wireless communication unit 120.

In some demonstrative embodiments, wireless communication units 110 and/or 120 may include, or may be associated with, one or more antennas 107 and 108, respectively. Antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. Antennas 107 and/or 108 may include, for example, antennas suitable for directional communication, e.g., using beamforming techniques. For example, antennas 107 and/or 108 may include a phased array antenna, a multiple element antenna, a set of switched beam antennas, and/or the like. In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In some demonstrative embodiments, wireless communication devices 102 and/or 104 may include, for example, a PC, a desktop computer, a mobile computer, a laptop computer, a notebook computer, a tablet computer, an Ultrabook™, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

Devices 102 and/or 104 may also include, for example, one or more of a processor 191, an input unit 192, an output unit 193, a memory unit 194, and a storage unit 195. Device 102 may optionally include other suitable hardware components and/or software components. In some demonstrative embodiments, some or all of the components of device 102 may be enclosed in a common housing or packaging, and may be interconnected or operably associated using one or more wired or wireless links. In other embodiments, components of device 102 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, wireless communication link 103 may include a direct link, e.g., a P2P link, for example, to enable direct communication between devices 102 and 104.

In some demonstrative embodiments, wireless communication link 103 may include a wireless communication link over the mmWave band, e.g., the DMG band.

In some demonstrative embodiments, wireless communication devices 102 and/or 104 may perform the functionality of mmWave STAs, e.g., DMG stations ("DMG STA"). For example, wireless communication devices 102 and/or 104 may be configured to communicate over the DMG band.

In some demonstrative embodiments, wireless communication link 103 may include a wireless beamformed link.

In some demonstrative embodiments, wireless communication link 103 may include a wireless gigabit (WiGig) link. For example, wireless communication link 103 may include a wireless beamformed link over the 60 GHZ frequency band.

In other embodiments, wireless communication link 103 may include any other suitable link and/or may utilize any other suitable wireless communication technology.

In some demonstrative embodiments, antennas 107 may include at least one antenna array including a plurality of antenna elements 117. The plurality of antenna elements 117 may be configured, for example, for creation of a highly-directional antenna pattern. The plurality of antenna elements 117 may include, for example, about 16-36 antenna elements, or any other number of antenna elements, which may be placed in a predefined geometry. The plurality of antenna elements 117 may be configured to form a highly directive antenna pattern or a beam, which may be steered by setting appropriate signal phases at antenna elements 117, e.g., as described below.

In some demonstrative embodiments, antennas 107 may include a plurality of antenna modules. For example, antennas 107 may include a first antenna module 161, and a second antenna module 162. In other embodiments, antennas 107 may include any other number of antenna modules, e.g., more than two antenna modules.

In some demonstrative embodiments, antenna modules 161 and/or 162 may include, or may be included as part of, a radio frequency integrated circuit (RFIC).

In some demonstrative embodiments, antenna module 161 may include a first antenna subarray 135, and antenna module 162 may include a second antenna subarray 145.

The phrase "antenna subarray" as used herein may relate to a group of antenna elements of the plurality of antenna elements 117, which may be coupled, for example, to a common RF chain. In one example, antennas 107 may include an antenna array, which may be divided into a plurality of, e.g., independent subarrays, each capable of independently generating a directional beam. In another example, antennas 107 may include a plurality of different antenna arrays to generate a plurality of directional beams. In another example, antennas 107 may include a plurality of different antenna arrays to combinely generate a single directional beam. In another example, antennas 107 may include two or more different antenna arrays. One or more of the different antenna arrays may be divided into two or more subarrays.

In some demonstrative embodiments, first antenna subarray 135 may include a first plurality of antenna elements of the plurality of antenna elements 117 configured to form a first directional beam 137 directed in a first direction 139.

In some demonstrative embodiments, second antenna subarray 145 may include a second, e.g., different, plurality of antenna elements of the plurality of antenna elements 117 configured to form a second directional beam 147 directed in a second direction 149.

In some demonstrative embodiments, wireless communication unit 110 may include a plurality of Radio Frequency (RF) chains configured to control the first and second pluralities of antenna elements of antenna subarrays 135 and 145.

In some demonstrative embodiments, the plurality of RF chains may be coupled to the plurality of antenna subarrays. For example, antenna module 161 may include a first RF chain 130 coupled to first antenna subarray 135, and antenna module 162 may include a second RF chain 140 coupled to second antenna subarray 145. In other embodiments, wireless communication unit 110 may include any other number of RF chains coupled to the any other number of the plurality of antenna subarrays, e.g., more than two RF chains connected to more than two antenna subarrays.

In some demonstrative embodiments, RF chains 130 and/or 140 may be coupled to antenna subarrays 135 and 145 through a plurality of feed lines 118, which may be, for example, micro-strip feed lines on the RFIC.

In some demonstrative embodiments, the plurality of antenna modules may enable processing of two or more independent signals, e.g., carrying different data. For example, antenna module 161 may process an RF signal 131, and antenna module 162 may process an RF signal 141.

In some demonstrative embodiments, RF chain 130 may include a plurality of phase shifters 115 configured to adjust the phases of the antenna elements of antenna subarray 135. For example, a phase shifter of phase shifters 115 may be configured to adjust a corresponding antenna element of antenna subarray 135.

For example, phases of the antenna elements of antenna subarrays 135 may be shifted, e.g., by phase shifters 115, to provide a constructive and/or destructive interference, configured to change the beamforming scheme of antenna subarray 135 and to change the direction of directional beam 137.

In some demonstrative embodiments, RF chain 140 may include a plurality of phase shifters 114 configured to adjust the phases of the antenna elements of antenna subarray 145.

For example, a phase shifter of phase shifters 114 may be configured to adjust a corresponding antenna element of antenna subarray 145. For example, phases of the antenna elements of antenna subarrays 145 may be shifted, e.g., by phase shifters 114, to provide a constructive and/or destructive interference, configured to change the beamforming scheme of antenna subarray 145 and to change the direction of directional beam 147.

In some demonstrative embodiments, RF chain 130 may include a summer/splitter block 113 coupled to phase shifters 115 and/or RF chain 140 may include a summer/splitter block 112 coupled to phase shifters 114.

In some demonstrative embodiments, summer/splitter block 113 may include a splitter 134, e.g., a multiplexer, configured to reproduce and split RF signal 131 between the antenna elements of antenna subarray 135 and to couple the reproduced signals of RF signal 131 to phase shifters 115, e.g., when transmitting RF signal 131.

In some demonstrative embodiments, summer/splitter block 113 may include a summer 136 configured to sum into RF signal 131 signals received from the antenna elements of antenna subarray 135, e.g., when receiving RF signal 131.

In some demonstrative embodiments, utilizing two or more antenna modules may enable baseband processing of two or more independent baseband signals, e.g., carrying different data, communicated via one or more directional beams. In contrast, utilizing a single antenna module may enable baseband processing of only one baseband signal, e.g., even if a large number of antenna elements 117 are utilized.

For example, antenna modules 161 and 162 may enable baseband processing, e.g., independent baseband processing, of a baseband signal 127 communicated via antenna module 161, and a baseband signal 129 communicated via antenna module 162.

In some demonstrative embodiments, wireless communication unit 110 may include a baseband 150 configured to control antenna modules 161 and 162 for communicating the baseband signals.

In some demonstrative embodiments, baseband 150 may process the baseband signals to be communicated via antenna modules 161 and 162. For example, baseband 150 may process signal 127 to be communicated via antenna module 161, and signal 129 to be communicated via antenna module 162.

In some demonstrative embodiments, baseband 150 may include a plurality of baseband processing chains configured to process data signals into baseband signals to be communicated via the plurality of antenna modules. For example, baseband 150 may include a first baseband processing chain 152 configured to process a data signal 105 into baseband signal 127 to be communicated via antenna module 161, and a second baseband processing chain 154 configured to process a data signal 109 into baseband signal 129 to be communicated via antenna module 162. In other embodiments, baseband 150 may include any other number of baseband processing chains configured to process any other number of data signals into baseband signals to be communicated via any other number of antenna modules, e.g., more than two baseband processing chains configured to process more than two signals to be communicated via more than two antenna modules.

In some demonstrative embodiments, signals 105 and/or 109 may include modulation components of a data signal 121 to be communicated utilizing wireless communication unit 110. In other embodiments, signals 105 and/or 109 may include modulation components of two, e.g., different, data signals.

Some demonstrative embodiments are described herein with reference to a wireless communication unit, e.g., wireless communication unit 110, configured to perform both transmission and reception of wireless communication signals, e.g., signals 127 and 129. Other embodiments may include a wireless communication unit capable of performing only one of transmission and reception of wireless communication signals.

In some demonstrative embodiments, wireless communication unit 110 may include a plurality of baseband (BB) to RF (BB2RF) converters interfacing between the plurality of antenna modules and baseband 150.

For example, wireless communication unit 110 may include BB2RF converters 133 interfacing between antenna module 161 and baseband 150, and BB2RF converters 143 interfacing between antenna module 162 and baseband 150. In other embodiments, wireless communication unit 110 may include any other number of BB2RF convertors interfacing between baseband 150 and any other number of antenna modules, e.g., more than two.

In some demonstrative embodiments, the plurality of BB2RF converters may be included as part of the plurality of antenna modules, e.g., as part of the RFIC. In other embodiments, the plurality of BB2RF converters may be implemented by a module deployed between antenna modules 161 and/or 162 and baseband 150.

In some demonstrative embodiments, the BB2RF converters may be configured to converts the RF signals into the baseband signals and/or vice versa, e.g., as described below.

In some demonstrative embodiments, BB2RF converter 133 may convert RF signal 131 into signal 127 and/or vice versa, and/or BB2RF converter 143 may convert RF signal 141 into baseband data signal 129 and/or vice versa.

In one example, BB2RF converter 133 may convert RF signal 131 into baseband data signal 127, and/or BB2RF converter 143 may convert RF signal 141 into signal 129, e.g., if wireless communication unit 110 receives signal 131.

In another example, BB2RF converter 133 may convert signal 127 into RF signal 131 and/or BB2RF converter 143 may convert signal 129 into RF signal 141, e.g., if wireless communication unit 110 transmits signal 127.

In some demonstrative embodiments, BB2RF converters 133 and/or 143 may include down-converters, configured to convert an RF signal into a baseband data signal, and to provide the baseband data signal to baseband 150, e.g., if wireless communication unit 110 receives the RF signals.

For example, BB2RF converter 133 may include a down converter 132 configured to down-convert RF signal 131 into signal 127, and to provide signal 127 to baseband 150.

In some demonstrative embodiments, baseband to RF converters 133 and/or 143 may include up-converters, configured to convert a baseband data signal into an RF signal and to provide the RF signal to an RF chain, e.g., if wireless communication unit 110 transmits the RF signals.

For example, BB2RF converter 133 may include an up-converter 138 configured to up-convert signal 127 into RF signal 131 and to provide RF signal 131 to RF chain 130.

In some demonstrative embodiments, baseband 150 may include a controller 122 configured to control antenna module 161 to form directional beam 137 and antenna module 162 to form directional beam 147.

In some demonstrative embodiments, controller 122 may control antenna modules 161 and/or 162 utilizing a control signal 128 carrying the amount of phase shift to be applied to one or more phase shifters of phase shifters 115 and/or 114.

In some demonstrative embodiments, the phase shift adjustments to phase shifters 115 may determine and/or control the beam width, gain and/or direction of directional beam 137 formed by antenna subarray 135.

In some demonstrative embodiments, the phase shift adjustments to phase shifters 114 may determine and/or control the beam width, gain and/or direction of directional beam 147 formed by antenna subarray 145.

In some demonstrative embodiments, each phase shifter of an antenna element of antenna subarrays 135 and/or 145 may perform a local phase adjustment to a signal to create a local phase distribution in a desired beam direction.

In some demonstrative embodiments, control signal 128 may include weighting coefficients, which may be generated and/or derived by controller 122, configured to steer directional beams 137 and/or 147.

In some demonstrative embodiments, controller 122 may provide via control signal 128 a first set of weighting coefficients to phase shifters 115 configured to form a local phase adjustment to one or more antenna elements of antenna subarray 135, resulting in directing beam 137 to direction 139.

In some demonstrative embodiments, controller 122 may provide via control signal 128 a second set of weighting coefficients to phase shifters 114 configured to form a local phase adjustment to one or more antenna elements of antenna subarray 145, resulting in directing beam 147 to direction 149.

In some demonstrative embodiments, wireless communication unit 110 may utilize the two or more antenna modules to perform beamformed diversity communication, e.g., as described below.

The phrase "beamformed diversity communication", as used herein, may relate to a wireless beamformed communication utilizing a plurality of beams.

In some demonstrative embodiments, wireless communication unit 110 may be utilized by a first device performing the functionality of a Transmit (TX) side and a second device performing the functionality of as a Receive (RX) side to form a plurality of independent directional beams between the TX and RX sides. Accordingly, the plurality of directional beams may be utilized for using a plurality of independent paths for communicating a plurality of data streams, e.g., different data streams, thus increasing total throughput. For example, the plurality of directional beams may be utilized in a relatively small area, e.g., small spaces, rooms, distances of lesser than 50 meters, and the like.

Some demonstrative embodiments are described herein with reference to a communication system, e.g., wireless communication system 100, wherein both the TX side and the RX side utilize a plurality of antenna modules to communicate a MIMO transmission. However, other embodiments may be implemented with respect to systems configured to communicate any other diversity communication, for example, systems in which only one of the Tx and Rx sides utilizes a plurality of antenna modules, e.g., to form a Single-Input-Multi-Output (SIMO) and/or a Multi-Input-Single-Output (MISO) beamformed link. For example, one of the Tx and Rx sides may utilize an omni-directional antenna, and another one of the Tx and Rx sides may utilize a multi-array transceiver, e.g., wireless communication unit 110. In one example, wireless communication unit 110 may communicate a Multi-User (MU) MIMO communication by communicating over a plurality of beams directed from the Tx side to a plurality of Rx sides. In another example, wireless communication unit 110 may communicate a Multi-User (MU) MIMO communication by communicating over a plurality of beams directed from a plurality of Tx sides to the Rx side.

In some demonstrative embodiments, a plurality of different signals may be communicated via a plurality of beamformed links formed by the plurality of beamformed beams. Each beamformed link, which corresponds to an antenna module of the plurality of antenna modules, may communicate a signal, for example, via a plurality of antenna elements of the antenna module.

In some demonstrative embodiments, a first signal, e.g., signal 127, may be communicated via a first beamformed link formed by directional beam 137 generated by antenna module 161, and a second, e.g., different signal, for example, signal 129, may be communicated via a second beamformed link formed by directional beam 147 generated by antenna module 162.

In some demonstrative embodiments, controller 122 may provide a first set of weighting coefficients to phase shifters 114 to form directional beam 137, and a second, e.g., different, set of weighting coefficients to phase shifters 115 to form directional beam 147.

In some demonstrative embodiments, wireless communication unit 110 may utilize the two or more antenna modules to communicate via a composite directional beam. For example, wireless communication unit 110 may utilize antennas 107 to form a composite directional beam 157 directed in a beam direction 159.

In some demonstrative embodiments, wireless communication unit 110 may utilize antenna modules 161 and/or 162 to operate as a composite antenna array with increased beamforming capability to form composite directional beam 157. For example, the composite antenna array may have greater beamforming capabilities compared to each one of antenna modules 161 and 162.

In one example, wireless communication unit 110 may utilize directional beam 157 to communicate a high-gain directional communication. For example, wireless communication unit 110 may utilize directional beam 157 for communicating data streams in a relatively large area, e.g., an outdoor area, a relatively large space, and/or for a distance greater than 50 meters.

The phrase "high-gain directional communication", as used herein may relate to a wireless communication at a gain greater than 30 Decibel isotropic (dBi), e.g., utilizing a relatively narrow steerable beam.

In some demonstrative embodiments, wireless communication unit 110 may be utilized by a Transmit (TX) side and a Receive (RX) side to form directional beam 157 between the TX and RX sides.

In some demonstrative embodiments, controller 122 may utilize antenna modules 161 and 162 to form directional beam 157. For example, wireless communication unit 110 may control antenna module 161 to form directional beam 137 in direction 159, and antenna module 162 to form directional beam 147 in direction 159 such that directional beam 157 may be formed as a combination of directional beams 137 and/or 147.

Some demonstrative embodiments are described herein with reference to a communication system, e.g., wireless communication system 100, wherein both the TX side and the RX side utilize a plurality of antenna modules to communicate via a composite directional beam. However, other embodiments may be implemented with respect to systems configured to communicate any other communication, for example, systems in which only one of the TX and RX sides utilizes a plurality of antenna subarrays, e.g., to communicate via the composite directional beam. For example, one of the TX and RX sides may utilize an omni-directional antenna, and another one of the TX and RX sides may utilize a multi-array transceiver, e.g., wireless communication unit 110.

In some demonstrative embodiments, wireless communication unit 110 may communicate data signal 121 via directional beam 157 formed by the combination of both directional beams 137 and 147. For example, wireless communication unit 110 may distribute the same data components of data signal 121 to both signals 105 and 109, such that a data component of data signal 121 is communicated via both a first beamformed link formed by directional beam 137 generated by antenna module 161 in direction 159, and a second beamformed link formed by antenna module 162 generated by antenna subarray 145 in direction 159. Accordingly, the data component of data signal 121 may be communicated via directional beam 157, which may be formed by a combination of directional beams 137 and 147.

In some demonstrative embodiments, controller 122 may determine the first and second set of weighting coefficients to form directional beam 157 in direction 159. For example, controller 122 may determine a suitable set of weighting coefficients to phase shifters 114 and 115 to compose directional beam 157, e.g., as a combination of directional beams 137 and 147.

In some demonstrative embodiments, controller 122 may control antenna modules 161 and/or 162 to communicate the data signal 121 via directional beam 157.

In some demonstrative embodiments, electronic devices, e.g., as laptops, notebooks, netbooks, personal digital assistants (PDAs) and mobile phones, may include a variety of wireless communication capabilities operating at increased data rates. The wireless communication systems used by the devices are expanding into the higher carrier frequency ranges of the communication spectrum, e.g., the mmWave and/or the 60 GHz band. The higher carrier frequency may increase propagation losses and attenuation of signals to be communicated at the higher frequency, and it may become difficult to implement antenna systems in a manner that simultaneously provides a desired gain and spatial coverage.

Propagation conditions of signals in the mmWave band together with short wavelengths of the signals may require use of antennas with very high gain, e.g., creating a very narrow beam, and yet having capability of steering the beam within a relatively large angle.

Communication in the mmWave band at relatively large distances, e.g., of approximately 50 meters or more, for example, outdoors or in large spaces, may typically require using highly directional antennas with gains greater than 30 dBi to compensate for the attenuation losses. Additionally, the communication may require relatively wide sector coverage to communicate with other devices and stations. Phased array antennas of a required size, e.g., suitable for mmWave communication, may impose limitations on the signal bandwidth. For example, as the ratio of signal bandwidth to carrier frequency increases, the beam may be dispersed and the desired narrow beam, e.g., a "pencil-thin" beam, may be transformed into an unsuitable wide-angle beam.

In some demonstrative embodiments, antennas 107 may be configured to perform the functionality of a modular antenna array, which may be configured for beamforming with controllable antenna module delays, e.g., to improve beam steering accuracy and/or to prevent beam dispersion for wide-band signals.

In some demonstrative embodiments, utilizing only phase shifts to control phase shifters 115 and/or 114 may limit the granularity and/or range of angles for steering directional beam 157.

Figure 2A:
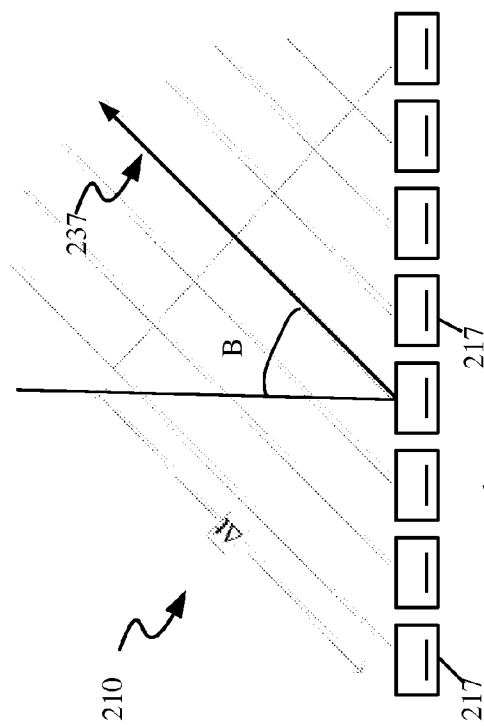
FIGS. 2A, 2B and 2C are schematic illustrations of signal characteristics of a phased array antenna, in accordance with some demonstrative embodiments.
Figure 2B:
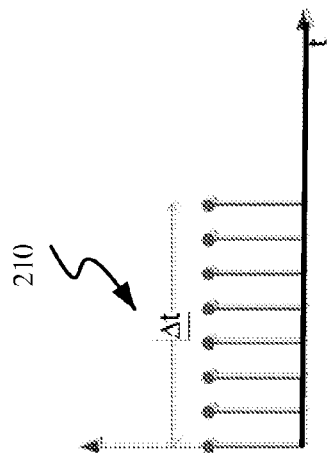
Figure 2C:
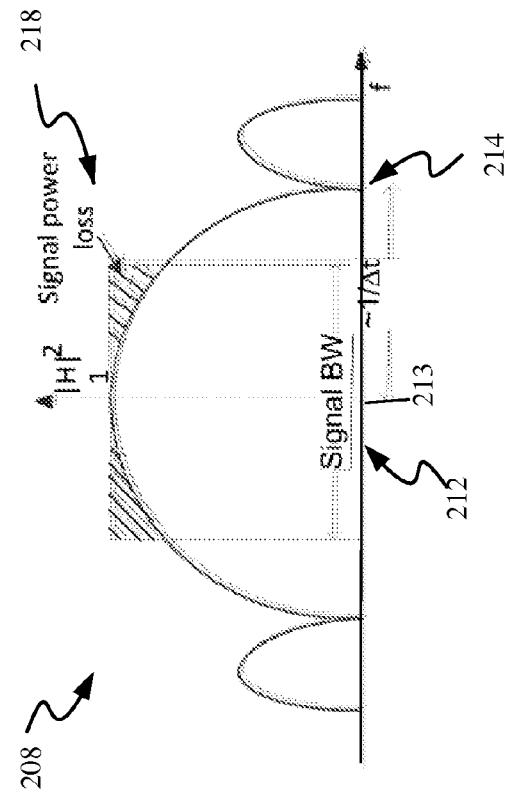

Reference is made to FIGS. 2A, 2B and 2C, which schematically illustrate signal characteristics of a signal transmitted via a phased array antenna, in accordance with some demonstrative embodiments. For example, FIGS. 2A, 2B and 2C may represent characteristics of signals transmitted via antenna modules 161 and/or 162 (FIG. 1).

As shown in FIG. 2A, a plurality of antenna elements 217 may be configured in a linear array 235 to form a directional beam 237, which is steered at an angle, denoted B, relative to linear array 235. For example, antenna elements 217 may be included as part of antennas 107 (FIG. 1) to form directional beam 157 (FIG. 1).

As shown in FIG. 2B, different signal delays, e.g., up to a maximum delay 210, denoted Δt, may result from the varying distances of the transmission path between each antenna element of antenna elements 217 and a remotely located receiver, e.g., wireless communication unit 120 (FIG. 1).

In some demonstrative embodiments, the signal delays may create a time-domain channel impulse response 206 for antenna array 235. The channel impulse response 206 may include a number of taps, corresponding to a number of antenna elements 217, e.g., spaced over a range from zero to the maximum delay 210.

In some demonstrative embodiments, the time-domain channel impulse response may correspond to a frequency-domain channel transfer function 208, e.g., as shown in FIG. 2C.

As shown in FIG. 2C, frequency-domain channel transfer function 208 may include a first zero 214 in the squared magnitude, for example, located at a frequency, e.g., of approximately 1/Δt.

As shown in FIG. 2C, a signal power loss 218 may increase, for example, as a signal bandwidth 212 increases, e.g., approaching the zero point 214. The increased signal power loss 218 may result in degradation of an antenna gain in the direction of the main lobe of the antenna beam, e.g., since the channel transfer function may no longer be assumed to be flat within signal bandwidth 212.

In some demonstrative embodiments, the value of maximum delay 210 may increase, for example, if the aperture of the antenna array increases, e.g., a length of linear array 235 increases. Accordingly, an associated frequency selectivity of the channel increases since zero point 214 moves closer to a center frequency 213 of the signal.

In some demonstrative embodiments, linear array 235 may have limitations on the bandwidth of the signal for which a beam may be efficiently steered, for example, if only phase shifters are used to steer the beam.

For example, an approximate relation between a signal bandwidth, e.g., relative to a carrier frequency, which may be efficiently steered, and an antenna aperture can be expressed, e.g., as follows:

$$\frac{\Delta f}{f} \ll \frac{\lambda}{A} = \frac{1}{N} \qquad (1)$$

wherein Δf denotes the signal bandwidth, f denotes the carrier frequency, λ denotes the signal carrier wavelength, A denotes the antenna aperture size, and N denotes the number of wavelengths that fit in the aperture.

In some demonstrative embodiments, a directional beam, e.g., directional beam 237, which carries a signal with a ratio of bandwidth to carrier frequency that exceeds the limit of Equation 1, may suffer from beam angle dispersion.

In some demonstrative embodiments, the beam angle dispersion may result, for example, from different frequency components of the signal being steered to different angles.

Figure 3:
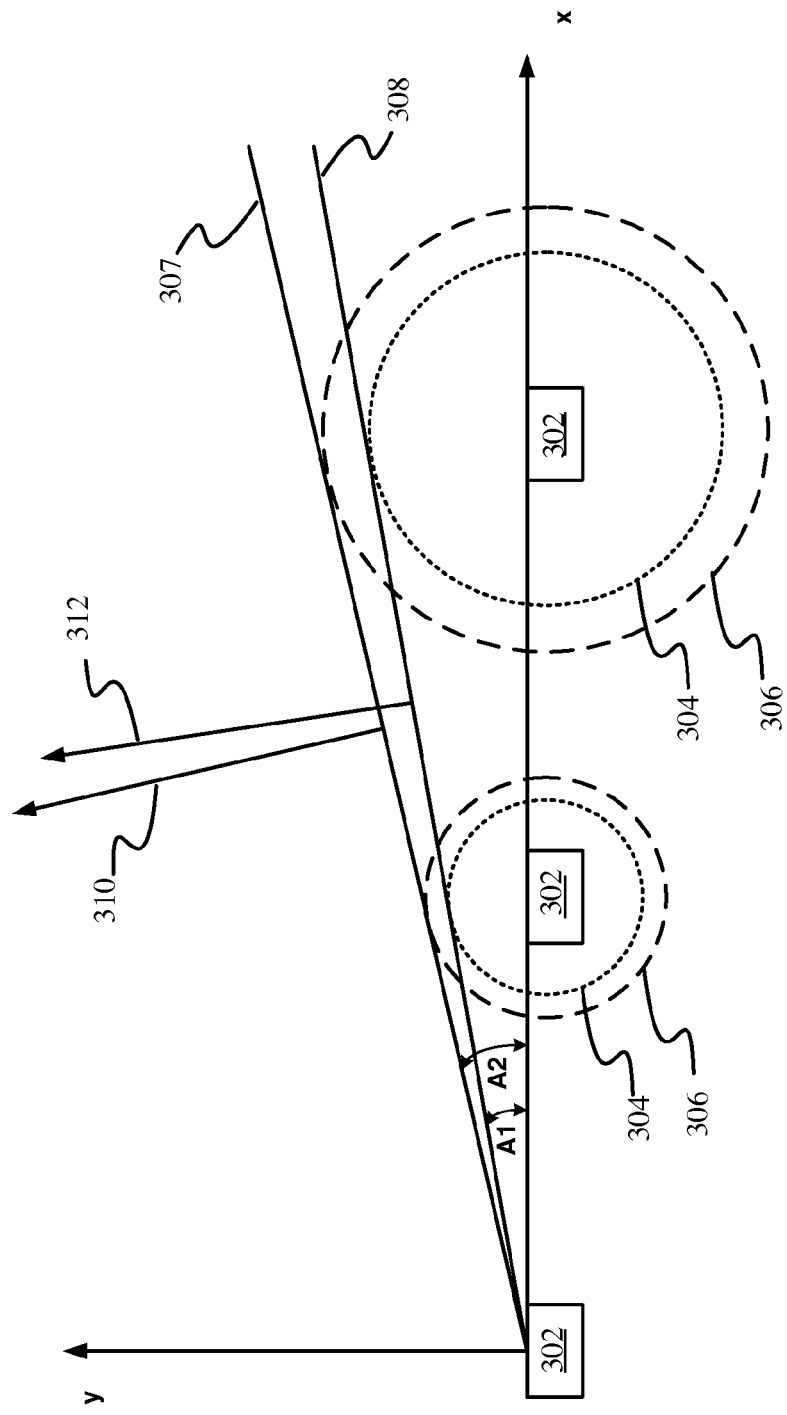
FIG. 3 is a schematic illustration of a beam angle dispersion of a phased array antenna, in accordance with some demonstrative embodiments.

Reference is made to FIG. 3, which schematically illustrates beam angle dispersion of a beam formed by a phased array antenna, in accordance with some demonstrative embodiments.

In some demonstrative embodiments, a signal may be radiated through the phased array antenna, and the phases of the phase shifters of the antenna may be set in accordance with a linear distribution calculated to steer the beam in a desired direction.

As shown in FIG. 3, an antenna element 302, e.g., an antenna element 217 (FIG. 2), may emit a high frequency signal component 304 and a low frequency signal component 306.

In some demonstrative embodiments, high frequency signal component 304 may represent the high frequency end of the signal bandwidth, and low frequency signal component 306 may represent the low frequency end of the signal bandwidth.

In some demonstrative embodiments, the travel distance of low frequency signal component 306 may be greater than the travel distance of high frequency signal component 304 for the same phase, for example, since the wavelength of the low frequency signal component 306 is greater than the wavelength of the high frequency signal component 304.

As shown in FIG. 3, a wave front 308 corresponding to the high frequency signal component 304 may steer a beam 312 at a first angle, denoted A1, and a wave front 307 corresponding to the low frequency signal component 306 may steer a beam 310 at a second angle, denoted A2. The second angle A2 may be greater than the first angle A1.

As shown in FIG. 3, a direction of beam 310 is displaced from a direction of beam 312, which may result in beam dispersion, e.g., caused by the difference between angles A1 and A2.

In some demonstrative embodiments, applying adjustable time delays to components of a wireless communication signal, e.g., signal components 304 and/or 306, may align wave fronts 307 and 308, for example, since the signal travel distance may be directly proportional to the time delay and may not depend on wavelength or frequency.

Referring back to FIG. 1, in some demonstrative embodiments, a time delay may be applied to signals 105 and 109 to reduce dispersion of directional beam 157. For example, wireless communication unit 110 may apply the time delay to communicate via composite directional beam 157.

In some demonstrative embodiments, utilizing only phase shifts to control phase shifters 115 and/or 114 may limit the granularity and/or range of angles for steering directional beam 157.

In some demonstrative embodiments, an adjustable time delay module may be employed to apply a time delay to a signal to be communicated via a corresponding antenna module of antenna modules 161 and/or 162.

For example, a first adjustable time delay module may be employed to apply a time delay to signal 127 to be communicated via antenna module 161, and a second adjustable time delay module may be employed to apply a time delay to signal 129 to be communicated via antenna module 162. The adjustable time delay modules may significantly reduce the number of delay modules and the cost of the system, e.g., compared to a number of time delay modules required for applying the time delay in the RFIC.

In some demonstrative embodiments, utilizing the adjustable time delay modules may reduce the total system channel delay spread to a value, which is more closely associated with the delay spread of a single antenna module sub-array.

In some demonstrative embodiments, the time delay modules may be implemented as part of baseband 150, e.g., as described in detail below. For example, the adjustable time delay modules may be configured, for example, such that the beam dispersion may be invariant, e.g., with respect to the number of antenna modules In some demonstrative embodiments, the adjustable time delays may include values based on a desired beam steering angle and/or a geometry of antennas 107.

In some embodiments, the time delay value for each antenna module of antenna modules 161 and/or 162 (FIG. 1) may be calculated as:

$$\Delta t = n*L*\sin(A)/c \qquad (2)$$

wherein n denotes the antenna module index, e.g., 0, 1 . . . N−1 for N antenna modules, L denotes the distance between antenna modules 161 and 162, A denotes the steering angle, e.g., beam direction 159, and c denotes the speed of light.

In some demonstrative embodiments, implementing the adjustable time delays in the RFIC, e.g., by applying the adjustable time delays to phase shifters 114 and/or 115, may be relatively expensive and/or complex. For example, implementing an adjustable time delay at high resolution frequency bands, e.g., the DMG frequency bands, and providing the time delays for each antenna element in a very large antenna array, e.g., antennas 107, may be relatively complex.

In some demonstrative embodiments, wireless communication unit 110 may utilize digital processing for applying the time delays to antenna modules 161 and/or 162. For example, wireless communication unit 110 may utilize the digital processing to steer the beams, e.g., instead of steering the beam by phase shifting of the signal, e.g., by phase shifters 114 and/or 115.

In some demonstrative embodiments, the digital processing for applying the time delays to the antenna modules may be implemented utilizing baseband processing techniques. For example, wireless communication unit 110 may be configured to apply the time delay at baseband 150.

In some demonstrative embodiments, applying the time delays at baseband 150 may allow beam steering, for example, substantially in any direction within a relatively wide angle.

In some demonstrative embodiments, the baseband processing may utilize some properties of a modulation scheme utilized for the wireless communication, for example, Orthogonal Frequency-Division Multiplexing (OFDM), Single Carrier with Frequency Domain Equalization (SC-FDE), and the like, in order to apply the time delays to the antenna modules, e.g., as described below.

In some demonstrative embodiments, applying the time delays at baseband 150 may be implemented via baseband processing of signals, e.g., ODFM and/or SC-FDE signals.

In some demonstrative embodiments, applying the time delays at baseband 150 may enable the granularity of adjustment of time delays between antenna modules 161 and/or 162 to be lesser than a sampling time of baseband 150. Such granularity may enable, for example, to smoothly steer directional beam 157 to a wide range of angles.

In some demonstrative embodiments, the time delays may be applied to signals 105 and/or 109 as part of a frequency-domain signal processing of baseband 150.

In some demonstrative embodiments, applying the time delays as part of the frequency-domain signal processing may allow adjusting the time delays between different sub-arrays of antenna subarrays 135 and/or 145 at a desired granularity, e.g., as described below.

In some demonstrative embodiments, baseband processing chains 152 and 154 may include a plurality of frequency domain delay modules to apply a time delay to a signal to be communicated via a corresponding antenna module of the plurality of antenna modules.

In some demonstrative embodiments, baseband processing chain 152 may include a frequency domain delay module 153 to apply a time delay to signal 105 to be communicated via antenna module 161.

In some demonstrative embodiments, baseband processing chain 154 may include a frequency domain delay module 155 to apply a time delay to signal 109 to be communicated via antenna module 162.

In some demonstrative embodiments, baseband 150 may process signal 127 received via antenna module 161, e.g., by baseband processing chain 152 and frequency domain delay module 153.

In some demonstrative embodiments, baseband 150 may process signal 129 received via antenna module 162, e.g., by baseband processing chain 154 and frequency domain delay module 155.

In some demonstrative embodiments, baseband 150 may process signal 105 to be transmitted via antenna module 161, e.g., by baseband processing chain 152 and frequency domain delay module 153.

In some demonstrative embodiments, baseband 150 may process signal 109 to be transmitted via antenna module 162, e.g., by baseband processing chain 154 and frequency domain delay module 155.

In some demonstrative embodiments, controller 122 may control, e.g., via control signals 123, the time delay applied by frequency-domain delay modules 153 and/or 155.

In some demonstrative embodiments, frequency domain delay modules 153 and/or 155 may apply the time delay by shifting a plurality of frequency-domain signals by a plurality of phase shifts. For example, shifting the frequency-domain signals by the plurality of phase shifts may result in a delay of a plurality of time samples in the time-domain, e.g., corresponding to the plurality of the phase shifts.

In some demonstrative embodiments, the plurality of frequency-domain signals may include frequency components of a signal, e.g., signal 105 or 109 (FIG. 1), to be communicated via a corresponding antenna module, e.g., antenna modules 161 and/or 162 (FIG. 1).

For example, frequency domain delay module 153 may apply the time delay by shifting a plurality of frequency components of signal 105 by a plurality of phase shifts, and frequency domain delay module 155 may apply the time delay by shifting a plurality of frequency components of signal 109 by a plurality of phase shifts.

In some demonstrative embodiments, the plurality of phase shifts may be separated by a predefined phase shift, denoted $\phi_0$, e.g., as described below.

In some demonstrative embodiments, controller 122 may determine the predefined phase shift $\phi_0$ based on the time delay to be applied to the signals, e.g., the time delay Δt, as described above with reference to Equation 2.

In some demonstrative embodiments, the predefined phase shift $\phi_0$ may be based on a baseband sampling rate of baseband 150 and a number of the plurality of the frequency-domain signals, for example, according to a Fast Fourier Transform (FFT) size for converting the signals between the frequency-domain and the time-domain, e.g., as follows:

$$\varphi_0 = \frac{\Delta t 2\pi}{T_s N_{FFT}} \quad (3)$$

wherein Δt denotes the required time delay, e.g., as described above with reference to Equation 2, $T_s$ denotes the sampling rate duration of baseband 150, and $N_{FFT}$ is the FFT size.

Figure 4:
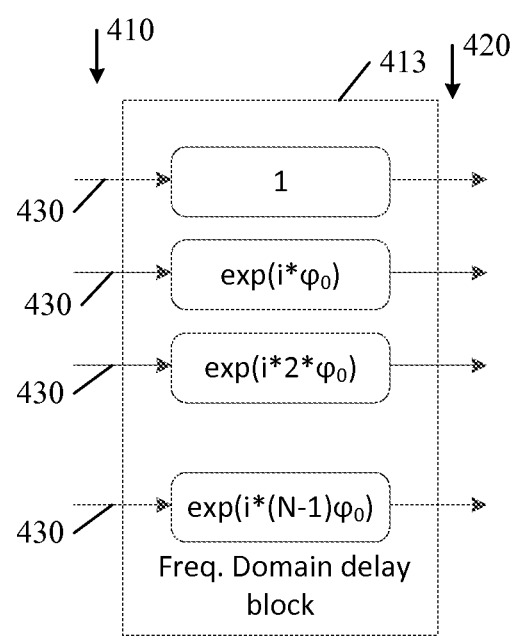
FIG. 4 is a schematic illustration of a frequency-domain delay block, in accordance with some demonstrative embodiments.

Reference is made to FIG. 4, which schematically illustrates a frequency-domain delay block 413, in accordance with some demonstrative embodiments. For example, frequency domain delay block 413 may perform the functionality of frequency domain delay modules 153 and/or 155 (FIG. 1).

As shown in FIG. 4, frequency domain delay block 413 may receive as inputs a plurality of frequency-domain signals 410 and may provide as outputs a plurality of delayed frequency-domain signals 420, e.g., as described below.

In some demonstrative embodiments, frequency-domain signals 410 may include frequency components of a signal, e.g., signal 105 or 109 (FIG. 1), to be communicated via an antenna module, e.g., antenna module 161 and/or 162 (FIG. 1).

In some demonstrative embodiments, frequency-domain signals 410 may include modulation symbols of subcarriers, for example, for OFDM signals, e.g., as described below with reference to FIGS. 5A and 5B.

In some demonstrative embodiments, frequency-domain signals 410 may include samples of a frequency-domain representation of the time-domain signal, for example, for SC-FDE signals, e.g., as described below with reference to FIG. 5C.

In some demonstrative embodiments, frequency domain delay block 413 may be configured to shift the phase of each input 430 of frequency-domain signals 410 by a value that linearly depends on a number of the input.

In some demonstrative embodiments, a phase shift to be applied to an x-th input 430 of frequency-domain signals 410, x=0 ... ($N_{FFT}$−1), may be based on the phase shift $\phi_0$, e.g., as follows:

$$\exp(i*x*\phi_0) \quad (4)$$

wherein i denotes the imaginary unit. For example, an x-th frequency sample of input signals 410 may be represented by $A_x*\exp(i*\phi_x)$, wherein $A_x$ denotes the magnitude of the x-th sample, and $\phi_x$ denotes the phase of the x-th sample. According to this example, a resulting x-th delayed output 420 corresponding to the x-th input 410 may be represented by $A_x*\exp(i*\phi_x)*\exp(i*x*\phi_0)=A_x*\exp(i*(\phi_x+x*\phi_0))$.

In some demonstrative embodiments, frequency domain delay block 413 may produce high-resolution delay values, for example, since baseband 150 (FIG. 1) operates with relatively high-resolution numbers.

Referring back to FIG. 1, in some demonstrative embodiments, wireless communication unit 110 may communicate OFDM signals.

In some demonstrative embodiments, signal 127 may include an OFDM signal to be communicated via antenna module 161, and signal 129 may include an OFDM signal to be communicated via antenna module 162.

In some demonstrative embodiments, baseband processing chains 152 and/or 154 may be configured to process and/or generate OFDM signals. For example, baseband processing chain 152 may process signal 105 into signal 127 including an OFDM signal and/or 109 baseband processing chain 154 may process signal 109 into signal 129 including an OFDM signal, e.g., as described below with reference to FIGS. 5A and/or 5B.

In some demonstrative embodiments, wireless communication unit 110 may communicate SC-FDE signals.

In some demonstrative embodiments, signal 127 may include an SC-FDE signal to be communicated via antenna module 161, and signal 129 may include an SC-FDE signal to be communicated via antenna module 162.

In some demonstrative embodiments, baseband processing chains 152 and/or 154 may be configured to generate and/or process SC-FDE signals. For example, baseband processing chain 152 may process signal 105 into signal 127 including an SC-FDE signal and/or 109 baseband processing chain 154 may process signal 109 into signal 129 including an SC-FDE signal, e.g., as described below with reference to FIG. 5C.

Figure 5A:
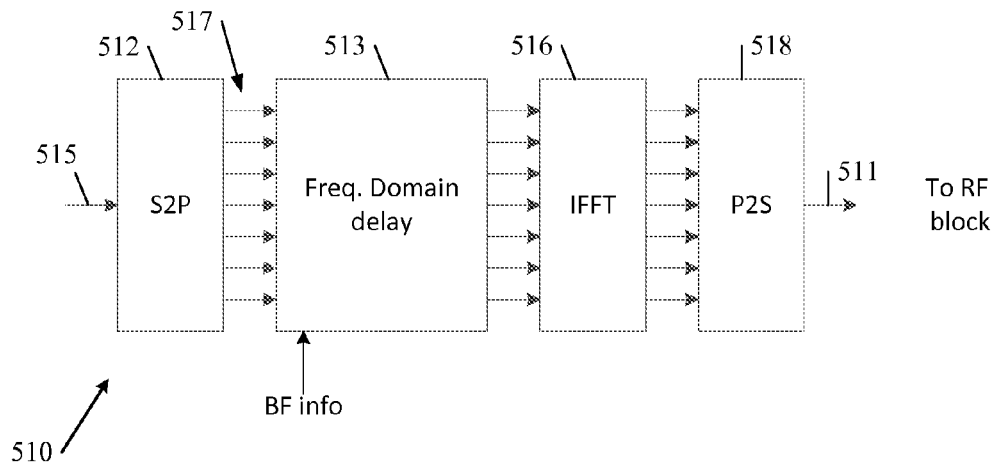
FIGS. 5A, 5B and 5C are schematic illustrations of three respective frequency-domain processing schemes, in accordance with some demonstrative embodiments.
Figure 5B:
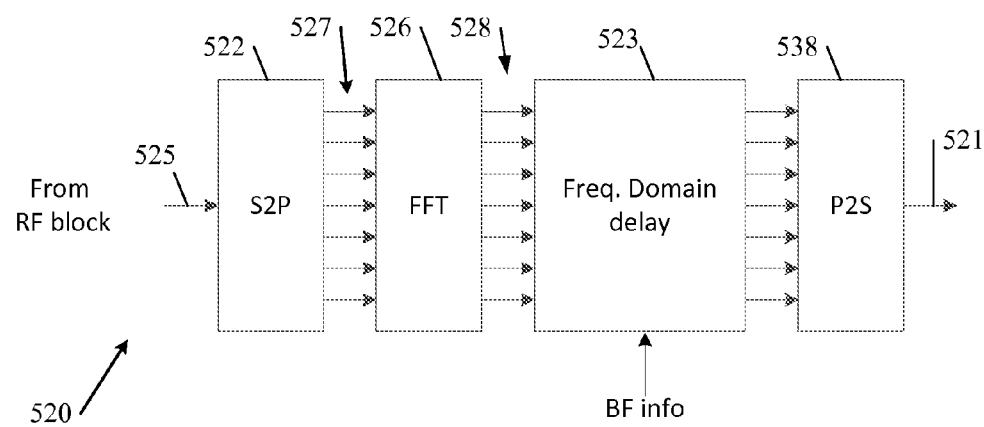
Figure 5C:
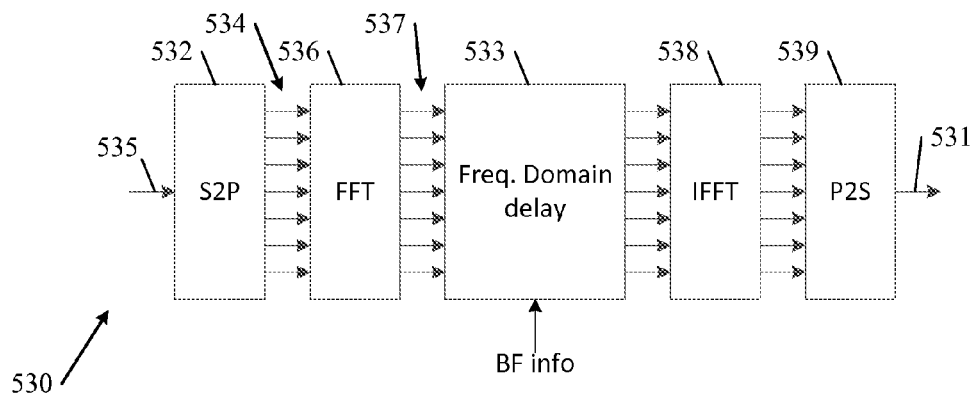

Reference is made to FIGS. 5A, 5B and 5C, which schematically illustrate three respective frequency-domain processing schemes 510, 520 and 530, in accordance with some demonstrative embodiments. For example, frequency-domain processing schemes 510, 520 and/or 530 may be implemented, and/or included, as part of baseband processing chains 152 and/or 154 (FIG. 1).

In some demonstrative embodiments, frequency-domain processing schemes 510 and/or 530 may apply the time delay to signals, e.g., signals 105 and 109 (FIG. 1), to be communicated via antenna modules 161 and/or 162 (FIG. 1); and/or frequency-domain processing scheme 520 may apply the time delay to signals, e.g., signals 105 and 109 (FIG. 1), corresponding to signals received via antenna modules 161 and/or 162 (FIG. 1).

In some demonstrative embodiments, frequency-domain processing scheme 510 may include a frequency domain delay block 513, frequency-domain processing scheme 520 may include a frequency domain delay block 523, and/or frequency-domain processing scheme 530 may include a frequency domain delay block 533. For example, frequency domain delay blocks 513, 523 and/or 533 may perform the functionality of frequency-domain delay block 413 (FIG. 4).

In some demonstrative embodiments, frequency-domain processing scheme 510 may be utilized to apply the time delays to an OFDM signal transmitted by an antenna module.

In some demonstrative embodiments, frequency-domain processing scheme 520 may be utilized to apply the time delays to an OFDM signal to be received by an antenna module.

In some demonstrative embodiments, frequency-domain processing schemes 510 and/or 520 may include only one block of frequency domain delay, e.g., frequency domain delay blocks 513 and/or 523, per antenna module, for example, since most of the base-band processing of an OFDM signal may be performed in the frequency-domain.

In some demonstrative embodiments, frequency-domain processing scheme 530 may be utilized to apply the time delays to an SC-FDE signal to be communicated by an antenna module.

In some demonstrative embodiments, frequency-domain processing scheme 510 may be utilized for applying the time delays to a signal 515 to be transmitted by an antenna module. For example, frequency-domain processing scheme 510 may be utilized to process signal 105 (FIG. 1) into signal 127 (FIG. 1) including an ODFM signal to be transmitted via antenna module 161 (FIG. 1).

As shown in FIG. 5A, frequency-domain processing scheme 510 may include a Serial to Parallel (S2P) converter 512 configured to convert signal 515 from a serial signal into a parallel signal 517.

In some demonstrative embodiments, frequency domain delay block 513 may apply the time delays to frequency-domain signal 517, e.g., as described above with reference to FIG. 4.

As shown in FIG. 5A, frequency domain delay block 513 may be implemented prior to an Inverse Fourier Fast Transform (IFFT) block 516 of an OFDM transmitter, e.g., as described below with reference to FIG. 6.

As shown in FIG. 5A, frequency-domain processing scheme 510 may include a Parallel to Serial (P2S) converter 519 configured to convert a parallel signal generated by IFFT block 516 into a serial signal 511.

In some demonstrative embodiments, frequency-domain processing scheme 520 may be utilized for applying the time delays to an OFDM signal 525 to be received by an antenna module. For example, frequency-domain processing scheme 520 may be utilized to process signal 127 (FIG. 1) including an OFDM signal received via antenna module 161 (FIG. 1) into signal 105 (FIG. 1).

As shown in FIG. 5B, frequency-domain processing scheme 520 may include a S2P converter 522 configured to convert a serial signal 525 into a parallel signal 527.

As shown in FIG. 5B, frequency-domain processing scheme 520 may include a Fourier Fast Transform (FFT) block 526 configured to apply an FFT transform to convert signal 527 into a frequency-domain signal 528.

In some demonstrative embodiments, frequency domain delay block 523 may apply the time delays to signal 528, e.g., as described above with reference to FIG. 4.

As shown in FIG. 5B, the frequency domain delay block 523 may be implemented subsequent to FFT block 526.

As shown in FIG. 5B, frequency-domain processing scheme 520 may include a P2S converter 529 configured to convert a parallel signal generated by frequency domain delay block 523 into a serial signal 521, e.g., signal 105 (FIG. 1).

In some demonstrative embodiments, frequency-domain processing scheme 530 may be utilized for applying the time delays to an SC-FDE signal 535 to be communicated by an antenna module.

In some demonstrative embodiments, frequency-domain processing scheme 530 may be utilized for transmission and/or reception of an SC-FDE signal 535. For example, frequency-domain processing scheme 530 may be utilized to communicate signal 105, including an SC-FDE signal via antenna module 161 (FIG. 1).

As shown in FIG. 5C, frequency-domain processing scheme 530 may include a S2P converter 532 configured to convert a serial signal 535 into a parallel signal 534.

As shown in FIG. 5C, frequency-domain processing scheme 530 may include an FFT block 536 configured to apply an FFT transform to convert signal 534 from the time-domain into a frequency-domain signal 537.

In some demonstrative embodiments, frequency domain delay block 533 may apply the time delays to signal 537, e.g., as described above with reference to FIG. 4.

As shown in FIG. 5C, frequency domain delay block 533 may be implemented between FFT block 536 and an IFFT block 538 of an SC-FDE transmitter, for example, to enable applying the time delay in the frequency-domain, e.g., as described below with reference to FIG. 8.

In some demonstrative embodiments, additional conversion to and/or from frequency-domain may be performed, for example, for SC-FDE signals at the transmitter side, and the frequency domain delay block 533 may be applied between the conversions.

In some demonstrative embodiments, the conversions may be standard, e.g., existing, processing steps needed for channel equalization, for example, for SC-FDE signals at the receiver side. Accordingly, the frequency domain delay block 533 may be implemented in addition to these conversions.

As shown in FIG. 5C, frequency-domain processing scheme 530 may include a P2S converter 539 configured to convert a parallel signal generated by IFFT block 538 block 523 into a serial signal 531.

Figure 6:
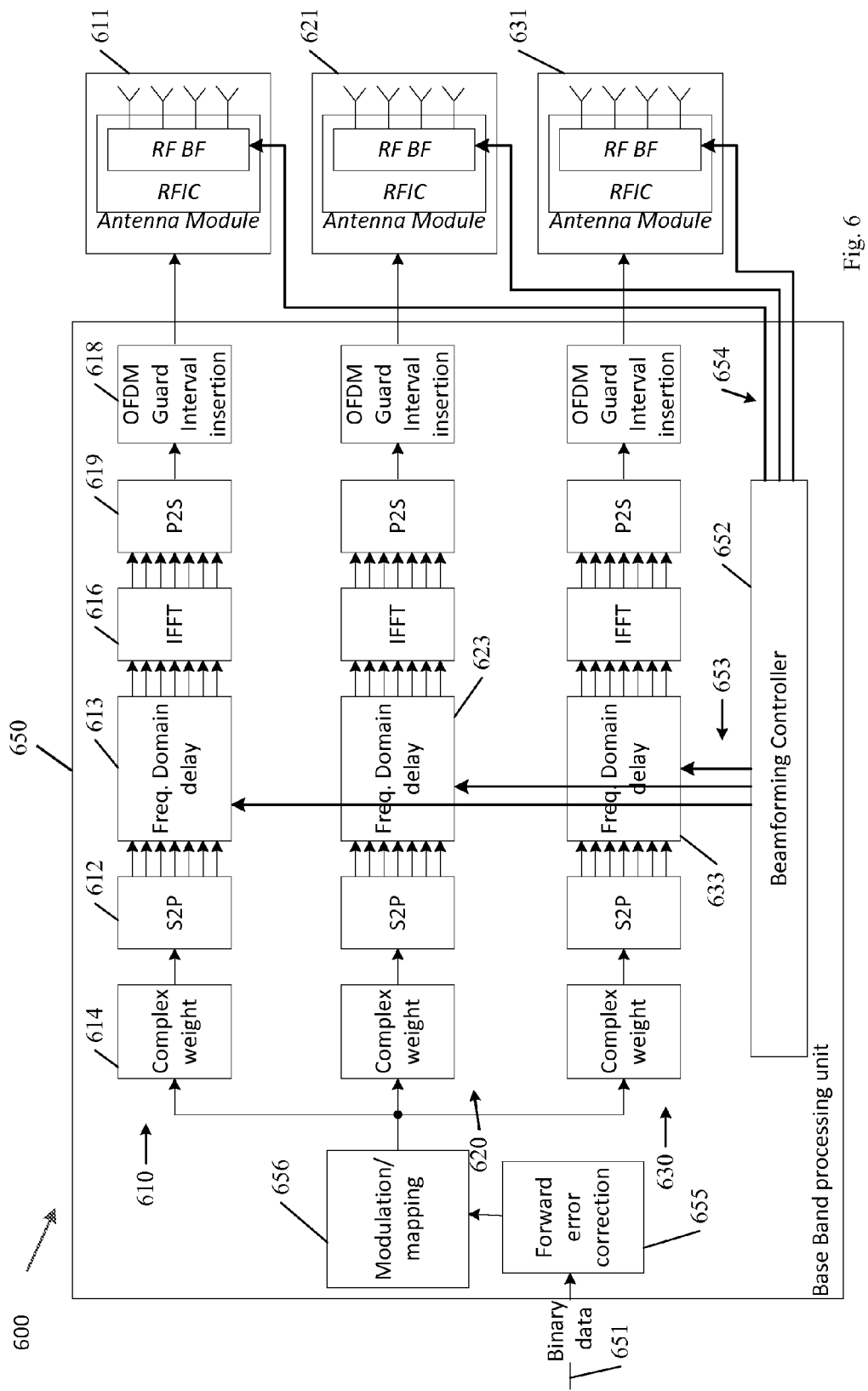
FIG. 6 is a schematic illustration of an Orthogonal Frequency-Division Multiplexing (OFDM) transmitter, in accordance with some demonstrative embodiments.

Reference is made to FIG. 6, which schematically illustrates an OFDM transmitter 600, in accordance with some demonstrative embodiments. For example, OFDM transmitter 600 may perform the functionality of wireless communication unit 110 (FIG. 1).

In some demonstrative embodiments, transmitter 600 may be configured to transmit a wireless transmission including data 651. For example, signal 121 (FIG. 1) may include data 651.

In some demonstrative embodiments, data 651 may be transmitted as an OFDM transmission via a composite directional beam, e.g., directional beam 157 (FIG. 1).

As shown in FIG. 6, OFDM transmitter 600 may include a baseband processing unit 650, e.g., baseband 150 (FIG. 1), configured to process data 651.

In some demonstrative embodiments, OFDM transmitter 600 may include a forward error correction block 655 to apply a forward error correction to data 651.

In some demonstrative embodiments, OFDM transmitter 600 may include a modulation/mapping block 656 to modulate and map data 651 into modulation symbols. For example, modulation/mapping block 656 may modulate and map data 651 into modulation symbols according to a Quadrature Phase Shift Keying (QPSK) scheme, a 16 Quadrature amplitude modulation (16-QAM) scheme, and/or any other modulation scheme.

In some demonstrative embodiments, the modulation symbols may be replicated and provided to a plurality of baseband processing chains 610, 620 and/or 630.

In some demonstrative embodiments, a baseband processing chain of baseband processing chains 610, 620 and/or 630 may optionally include a complex weighting block configured to apply complex weights to the modulation symbols. For example, baseband processing chain 610 may include a complex weighting block 614.

In some demonstrative embodiments, the complex weights may be applied, for example, prior to, or after converting the replicated data streams into the frequency domain. Applying the complex weights may be performed to optionally correct the signal phases, e.g., if a delay granularity of a frequency-domain delay block is not enough for required beamforming accuracy. Additionally or alternatively, the complex weights may be utilized to adjust the beam shape of different antenna modules, e.g., by applying different signal gains for the different antenna modules.

As shown in FIG. 6, a baseband processing chain of baseband processing chains 610, 620 and/or 630 may include a frequency-domain processing scheme, e.g., frequency-domain processing scheme 510 (FIG. 5A). For example, baseband processing chain 610 may include an S2P converter 612, e.g., S2P converter 512 (FIG. 5A), an IFFT block 616, e.g., IFFT block 516 (FIG. 5A), and a P2S converter 619, e.g., P2S converter 519 (FIG. 5A).

As shown in FIG. 6, baseband processing chains 610, 620 and 630 may include a plurality of frequency-domain delay blocks. For example, baseband processing chain 610 may include a frequency-domain delay block 613, baseband processing chain 620 may include a frequency-domain delay block 623 and/or baseband processing chain 630 may include a frequency-domain delay block 633. For example, frequency-domain delay blocks 613, 623 and 633 may perform the functionality of frequency-domain delay block 413 (FIG. 4).

As shown in FIG. 6, a baseband processing chain of baseband processing chains 610, 620 and/or 630 may include an OFDM guard interval insertion block configured to insert a cyclic extension, e.g., a guard interval, before an OFDM symbol. For example, baseband processing chain 610 may include OFDM guard interval insertion block 618 to insert the cyclic extension into an OFDM signal processed by baseband processing chain 610, for example, to mitigate and/or reduce inter-symbol interference between OFDM symbols transmitted by transmitter 600.

As shown in FIG. 6, a baseband processing chain of baseband processing chains 610, 620 and/or 630 may be coupled to a corresponding antenna module. For example, baseband processing chain 610 may be coupled to an antenna module 611, baseband processing chain 620 may be coupled to an antenna module 621 and/or baseband processing chain 630 may be coupled to an antenna module 631.

As shown in FIG. 6, each antenna module of antenna modules 611, 621 and/or 631 may include an RF chain and an antenna subarray including a plurality of antenna elements.

In some demonstrative embodiments, frequency-domain delay blocks 613, 623 and/or 633 may be configured to apply a time delay to a signal communicated via a respective antenna module. For example, frequency-domain delay block 613 may be configured to apply a time delay to a signal communicated via antenna module 611, frequency-domain delay block 623 may be configured to apply a time delay to a signal communicated via antenna module 621, and/or frequency-domain delay block 633 may be configured to apply a time delay to a signal communicated via antenna module 631.

In some demonstrative embodiments, the time delays to be applied by each of the frequency-domain delay blocks 613, 623 and/or 633 may be determined, for example, by a beamforming controller 652, and may be carried via control signals 653. For example, beamforming controller 652 may perform the functionality of controller 122 (FIG. 1).

In some demonstrative embodiments, the phase shifts to be applied by each of antenna modules 611, 621 and/or 631 may be determined, for example, by beamforming controller 652, and may be carried by control signals 654.

In some demonstrative embodiments, OFDM transmitter 600 may utilize the time delay applied by frequency-domain delay blocks 613, 623 and/or 633 to operate as a composite antenna beamforming array and to transmit the OFDM transmission, e.g., as described above.

Reference is made to FIGS. 7A, 7B, 7C, 7D and 7E, which schematically illustrate OFDM symbol structures of an OFDM signal in the time-domain, in accordance with some demonstrative embodiments. For example, the OFDM signal of FIG. 7E may be transmitted by transmitter 600 (FIG. 6) and processed by baseband processing chain 610 (FIG. 6).

Figure 7:
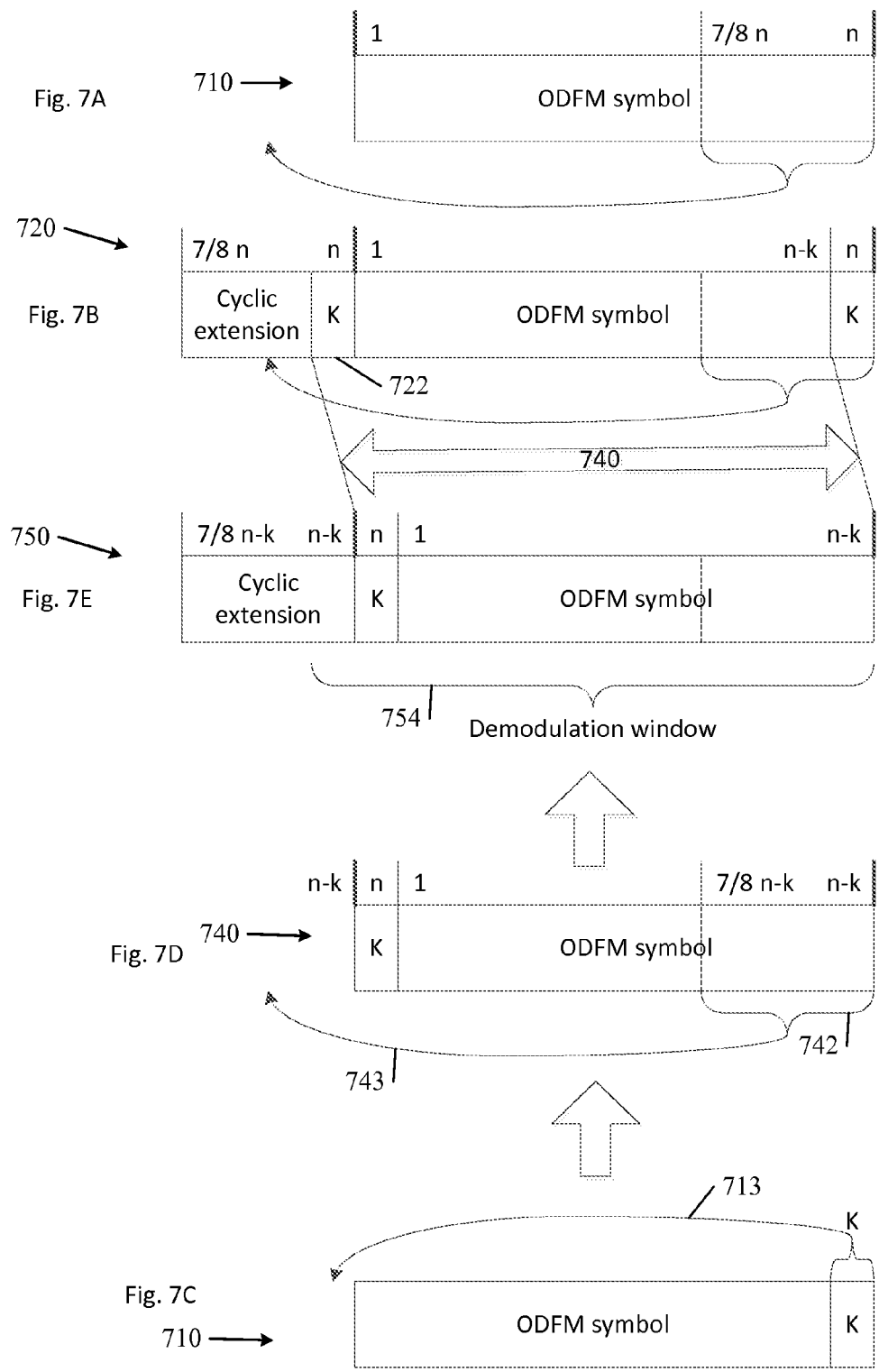
FIGS. 7A, 7B, 7C, 7D and 7E are schematic illustrations of OFDM symbol structures, in accordance with some demonstrative embodiments.

FIG. 7A illustrates an OFDM symbol structure 710 in the time-domain. For example, symbol structure 710 may represent an OFDM signal before adding a cyclic extension.

As shown in FIG. 7A, OFDM symbol structure 710 may include n time-domain samples.

FIG. 7B illustrates an example of an OFDM symbol structure 720 of an OFDM signal after adding the cyclic extension, if a time delay is not applied. Symbol structure 720 may represent the OFDM signal after insertion of a cyclic extension to OFDM symbol structure 710, e.g., by OFDM guard interval insertion block 618 (FIG. 6).

As shown in FIG. 7B, a portion 712 of symbol structure 710, e.g., the last 1/8 samples of symbol structure 710, may be copied and inserted prior to symbol structure 710 to form the cyclic extension.

In some demonstrative embodiments, applying the phase shift $\phi_0$ by frequency domain delay block 613 (FIG. 6), in the frequency-domain may result in a time delay of k samples in symbol structure 710 in the time-domain. For example, a time delay of $\Delta t$ calculated by Equation 2 may be equal to the sample duration of baseband 650 (FIG. 1) multiplied by k.

As shown in FIG. 7C, applying the phase shifts to the OFDM signal in the frequency-domain, e.g., by frequency domain delay block 613 (FIG. 6), may result in cyclically shifting (713) the k samples of symbol structure 710, e.g., to the beginning of OFDM symbol structure 710.

FIG. 7D illustrates a symbol structure 740 after cyclically shifting the k samples of symbol structure 710.

As shown in FIG. 7D, symbol structure 740 may include the k samples at the beginning of symbol structure 740 and, subsequent to the k samples, the remaining n-k samples, e.g., from sample 1 to sample n-k.

As shown in FIG. 7D, portion 742 of symbol structure 740, e.g., the last 1/8 samples of symbol structure 740, may be copied and inserted (743) prior to symbol structure 740 to form the cyclic extension, e.g., by guard interval insertion block 618 (FIG. 6).

As shown in FIG. 7D, portion 742 may include the last 1/8 samples of symbol structure 740, e.g., samples from sample (n-k) to sample (7/8)(n-k).

FIG. 7E illustrates a symbol structure 750 after insertion (743) of portion 742. For example, symbol structure 750 may include an OFDM signal after applying the time delay, e.g., by frequency domain block 613 (FIG. 6), and after insertion of guard interval, e.g., by guard interval insertion block 618 (FIG. 6).

As shown in FIG. 7E, symbol structure 750 may include a cyclic extension 752, e.g., including portion 742, and the remaining n samples, which may include the k samples prior to the remaining (n-k) samples.

As shown in FIGS. 7E and 7B, both symbol structures 720 and 750 may include a portion including symbol structure 740.

As shown in FIGS. 7E and 7B, a demodulation window 754, which may be used by a receiver to demodulate symbol structure 750, may include symbol structure 740 delayed by the k samples, e.g., compared to symbol structure 720.

In some demonstrative embodiments, the cyclic shift of symbol structure 710 resulting in symbol structure 750 may not affect the demodulation of the signal by an OFDM receiver, e.g., wireless communication unit 120 (FIG. 1), although symbol structure 750 is cyclically shifted compared to symbol structure 720.

Figure 8:
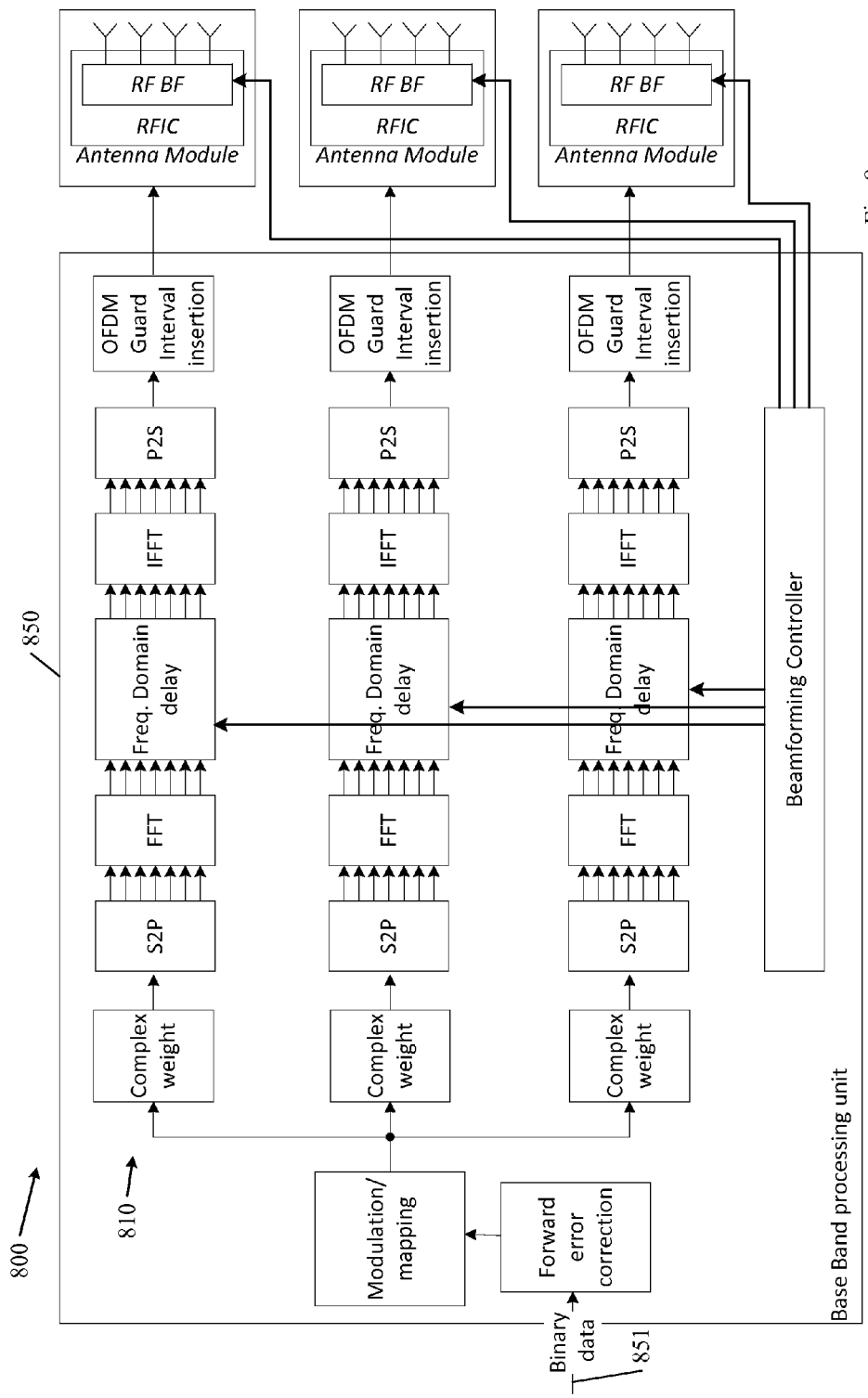
FIG. 8 is a schematic illustration of a Single Carrier with Frequency Domain Equalization (SC-FDE) transmitter, in accordance with some demonstrative embodiments.

Reference is made to FIG. 8, which schematically illustrates an SC-FDE transmitter 800, in accordance with some demonstrative embodiments. For example, SC-FDE transmitter 800 may perform the functionality of wireless communication unit 110 (FIG. 1).

In some demonstrative embodiments, transmitter 800 may be configured to transmit a wireless transmission including data 851. For example, signal 121 (FIG. 1) may include data 851.

In some demonstrative embodiments, data 851 may be transmitted utilizing a SC-FDE transmission via a composite directional beam.

As shown in FIG. 8, SC-FDE transmitter 800 may include a baseband processing unit 850, e.g., baseband 150 (FIG. 1), configured to process data 851.

As shown in FIG. 8, baseband processing unit 850 may include a plurality of baseband processing chains 810. For example, the plurality of baseband processing chains 810 may perform the functionality of baseband processing chain 152 and/or 154 (FIG. 1).

As shown in FIG. 8, each baseband processing chain 810 may include frequency-domain processing scheme 530 (FIG. 5C).

As shown in FIG. 8, baseband processing unit 850 may include a plurality of frequency-domain delay blocks, e.g., frequency-domain delay block 413 (FIG. 4), implemented as part of the plurality of baseband processing chains.

As shown in FIG. 8, each baseband processing chain 810 may be coupled to a corresponding antenna module.

In some demonstrative embodiments, each baseband processing chain 810 may apply a time delay to a signal to be communicated via a corresponding antenna module.

In some demonstrative embodiments, SC-FDE transmitter 800 may utilize the time delay applied by the frequency-domain delay blocks to operate as a composite antenna beamforming array and to transmit the SC-FDE transmission.

Figure 9:
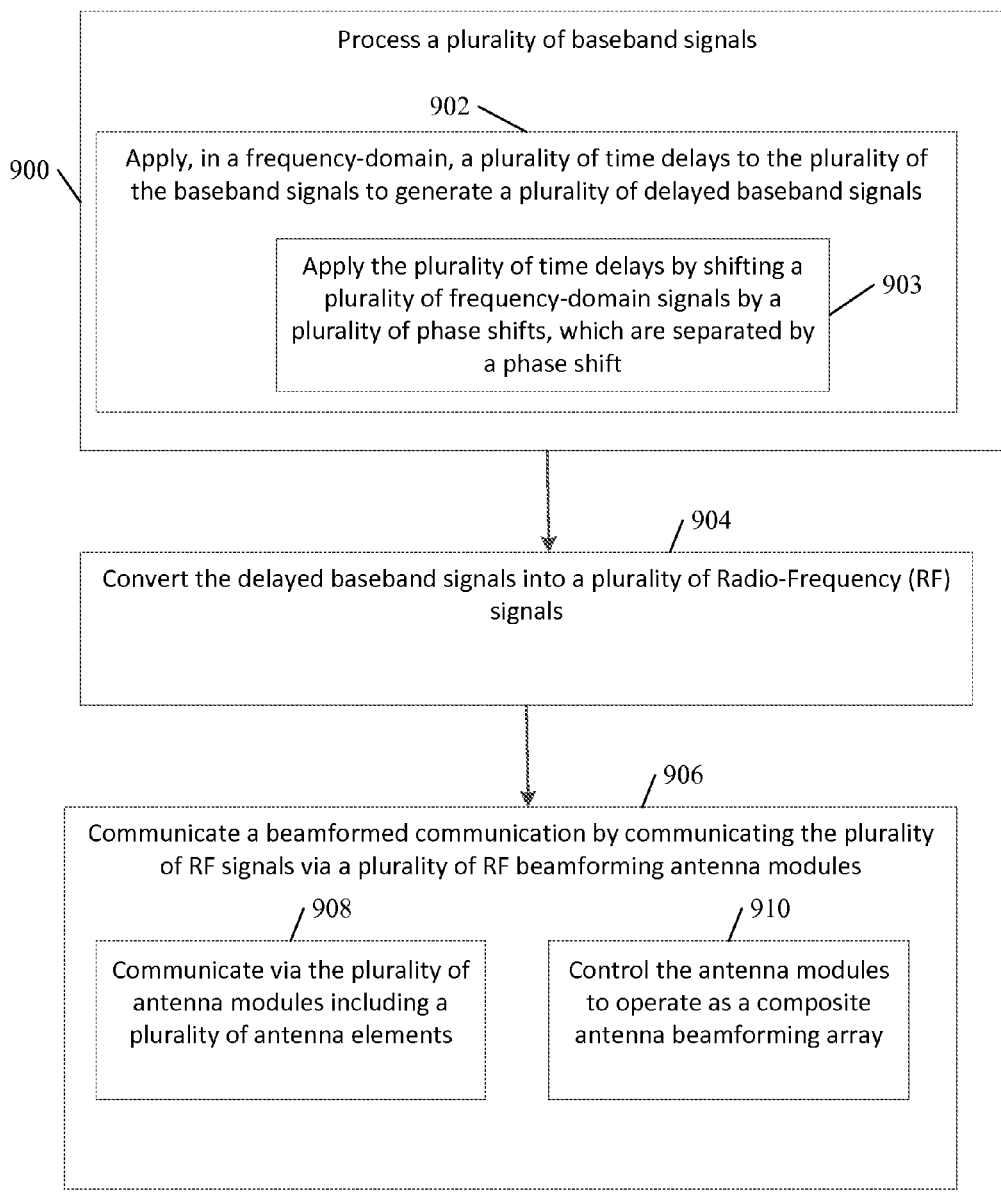
FIG. 9 is a schematic flow-chart illustration of a method of steering an antenna array, in accordance with some demonstrative embodiments.

Reference is made to FIG. 9, which schematically illustrates a method of steering an antenna array, in accordance with some demonstrative embodiments. In some embodiments, one or more of the operations of the method of FIG. 9 may be performed by a wireless communication system, e.g., system 100 (FIG. 1); a wireless communication device, e.g., device 102 (FIG. 1); a baseband, e.g., baseband 150 (FIG. 1); a controller, e.g., controller 122 (FIG. 1), and/or a wireless communication unit, e.g., wireless communication units 110 and or 120 (FIG. 1).

As indicated at block 900, the method may include processing a plurality of baseband signals. For example, baseband 150 may process signals 105 and/or 109 (FIG. 1), e.g., as described above.

As indicated at block 902, processing the plurality of baseband signals may include applying, in a frequency domain, a plurality of time delays to the plurality of the baseband signals to generate a plurality of delayed baseband signals. For example, frequency-domain delay modules 153 and/or 155 (FIG. 1) may apply time delays to signals 105 and 109 (FIG. 1) to generate delayed baseband signals, for example, signals 127 and/or 129 (FIG. 1), e.g., as described above.

As indicated at block 903, applying the plurality of time delays may include applying the plurality of time delays by shifting a plurality of frequency-domain signals by a plurality of phase shifts, which are separated by a predefined phase shift. For example, frequency-domain delay modules 153 and/or 155 (FIG. 1) may shift the plurality of frequency-domain components of signals 105 and/or 109 (FIG. 1) by the plurality of phase shifts, which are separated by the phase $\phi_0$, e.g., as described above.

As indicated at block 904, the method may include converting the delayed baseband signals into a plurality of Radio-Frequency (RF) signals. For example, BB2RF convertors 133 and/or 143 (FIG. 1) may convert signals 127 and/or 129 (FIG. 1) into RF signals 131 and/or 141 (FIG. 1), e.g., as described above.

As indicated at block 906, the method may include communicating a beamformed communication by communicating the plurality of RF signals via a plurality of RF beamforming antenna modules. For example, wireless communication unit 110 (FIG. 1) may communicate via directional beam 157 (FIG. 1) by communicating RF signals 131 and 141 via antenna modules 161 and 162 (FIG. 1), e.g., as described above.

As indicated at block 908, communicating the beamformed communication may include communicating via a plurality of RF beamforming antenna modules including a plurality of antenna elements. For example, wireless communication unit 110 (FIG. 1) may communicate signals 131 and/or 141 (FIG. 1) via antenna modules 161 and 162 (FIG. 1) including antenna subarrays 135 and 145 (FIG. 1), e.g., as described above.

As indicated at block 910, communicating the beamformed communication may include controlling the antenna modules to operate as a composite antenna beamforming array. For example, controller 122 (FIG. 1) may combinely control antenna modules 161 and 162 (FIG. 1) to operate as a composite antenna beamforming array to form composite directional beam 157 (FIG. 1), e.g., as described above.

Figure 10:
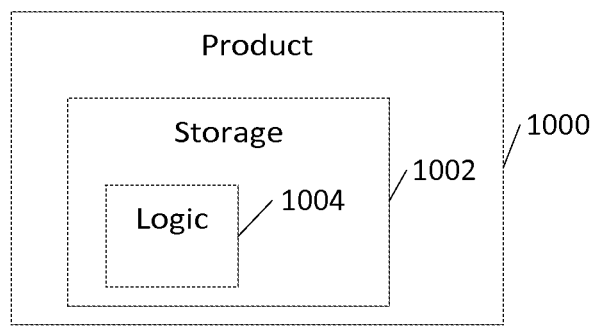
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include a non-transitory machine-readable storage medium 1002 to store logic 1004, which may be used, for example, to perform at least part of the functionality of device 102 (FIG. 1), device 104 (FIG. 1), wireless communication unit 110 (FIG. 1), wireless communication unit 120 (FIG. 1), baseband 150 (FIG. 1), and/or controller 122 (FIG. 1) and/or to perform one or more operations of the method of FIG. 9. The phrase "non-transitory machine-readable medium" is directed to include all computer-readable media, with the sole exception being a transitory propagating signal.

In some demonstrative embodiments, product 1000 and/or machine-readable storage medium 1002 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of wireless communication, the apparatus comprising a baseband processor including a plurality of baseband processing chains to process signals to be communicated via a plurality of antenna modules of an antenna array, wherein the baseband processing chains include a plurality of frequency domain delay modules, a frequency domain delay module of the delay modules is to apply a time delay to a signal to be communicated via an antenna module of the plurality of antenna modules.

Example 2 includes the subject matter of Example 1 and optionally, wherein the antenna module comprises an array of antenna elements coupled to a radio frequency (RF) beamforming circuit, the RF beamforming circuit is to adjust phase shifts to be applied to the antenna elements for forming a directional antenna beam.

Example 3 includes the subject matter of Example 1 or 2 and optionally, comprising a beamforming controller to control the plurality of antenna modules to operate as a composite antenna beamforming array to steer a composite beam.

Example 4 includes the subject matter of Example 3 and optionally, wherein the beamforming controller is to control a plurality of time delays applied by the plurality of frequency domain delay modules, the plurality of time delays configured for generating the composite beam.

Example 5 includes the subject matter of any one of Examples 1-4 and optionally, wherein the frequency domain delay block is to apply a cyclic delay to the signal in a frequency domain, the cyclic delay configured to result in the time delay in a time domain.

Example 6 includes the subject matter of any one of Examples 1-5 and optionally, wherein the frequency domain delay block is to apply the time delay by shifting a plurality of frequency-domain signals by a plurality of phase shifts.

Example 7 includes the subject matter of Example 6 and optionally, wherein the phase shifts are separated by a predefined phase shift value, which is based on the time delay.

Example 8 includes the subject matter of Example 7 and optionally, wherein the phase shift value is based on a baseband sampling rate of the baseband processor and a number of the plurality of frequency-domain signals.

Example 9 includes the subject matter of any one of Examples 1-8 and optionally, wherein the baseband processor is to process the signals received via the plurality of antenna modules.

Example 10 includes the subject matter of any one of Examples 1-9 and optionally, wherein the baseband processor is to process the signals to be transmitted via the plurality of antenna modules.

Example 11 includes the subject matter of any one of Examples 1-10 and optionally, wherein the signals comprise Orthogonal Frequency-Division Multiplexing (OFDM) signals.

Example 12 includes the subject matter of any one of Examples 1-10 and optionally, wherein the signals comprise Single Carrier with Frequency Domain Equalization (SC-FDE) signals.

Example 13 includes the subject matter of any one of Examples 1-12 and optionally, wherein the plurality of antenna modules are to communicate the signals over a millimeter wave (mmWave) frequency band or a Directional Multi-Gigabit (DMG) frequency band.

Example 14 include a system of wireless communication, the system comprising a wireless communication device including an antenna array including a plurality of antenna modules; and a baseband processor including a plurality of baseband processing chains to process signals to be communicated via the plurality of antenna modules, wherein the baseband processing chains include a plurality of frequency domain delay modules, a frequency domain delay module of the delay modules is to apply a time delay to a signal to be communicated via an antenna module of the plurality of antenna modules.

Example 15 includes the subject matter of Example 14 and optionally, wherein the antenna module comprises an array of antenna elements coupled to a radio frequency (RF) beamforming circuit, the RF beamforming circuit is to adjust phase shifts to be applied to the antenna elements for forming a directional antenna beam.

Example 16 includes the subject matter of any one of Examples 14-15 and optionally, comprising a beamforming controller to control the plurality of antenna modules to operate as a composite antenna beamforming array to steer a composite beam.

Example 17 includes the subject matter of Example 16 and optionally, wherein the beamforming controller is to control a plurality of time delays applied by the plurality of frequency domain delay modules, the plurality of time delays configured for generating the composite beam.

Example 18 includes the subject matter of any one of Examples 14-17 and optionally, wherein the frequency domain delay block is to apply a cyclic delay to the signal in a frequency domain, the cyclic delay configured to result in the time delay in a time domain.

Example 19 includes the subject matter of any one of Examples 14-18 and optionally, wherein the frequency domain delay block is to apply the time delay by shifting a plurality of frequency-domain signals by a plurality of phase shifts.

Example 20 includes the subject matter of Example 19 and optionally, wherein the phase shifts are separated by a predefined phase shift value, which is based on the time delay.

Example 21 includes the subject matter of Example 20 and optionally, wherein the phase shift value is based on a baseband sampling rate of the baseband processor and a number of the plurality of frequency-domain signals.

Example 22 includes the subject matter of any one of Examples 14-21 and optionally, wherein the baseband processor is to process the signals received via the plurality of antenna modules.

Example 23 includes the subject matter of any one of Examples 14-22 and optionally, wherein the baseband processor is to process the signals to be transmitted via the plurality of antenna modules.

Example 24 includes the subject matter of any one of Examples 14-23 and optionally, wherein the signals comprise Orthogonal Frequency-Division Multiplexing (OFDM) signals.

Example 25 includes the subject matter of any one of Examples 14-23 and optionally, wherein the signals comprise Single Carrier with Frequency Domain Equalization (SC-FDE) signals.

Example 26 includes the subject matter of any one of Examples 14-25 and optionally, wherein the plurality of antenna modules are to communicate the signals over a millimeter wave (mmWave) frequency band or a Directional Multi-Gigabit (DMG) frequency band.

Example 27 includes a method of wireless communication, the method comprising processing a plurality of baseband signals, the processing including applying, in a frequency domain, a plurality of time delays to the plurality of a baseband signals to generate a plurality of delayed baseband signals in a time domain; and communicating a beamformed communication via a plurality of Radio Frequency (RF) beamforming antenna modules based on the plurality of delayed baseband signals.

Example 28 includes the subject matter of Example 27 and optionally, including converting the delayed baseband signals into a plurality of RF signals, and communicating the beamformed communication by communicating the plurality of RF signals via the plurality of RF beamforming antenna modules.

Example 29 includes the subject matter of Example 27 or 28 and optionally, wherein each RF beamforming antenna module includes an array of antenna elements coupled to a RF beamforming circuit, the method comprising adjusting phase shifts to be applied to the antenna elements for forming a directional antenna beam.

Example 30 includes the subject matter of any one of Examples 27-29 and optionally, comprising controlling the plurality of antenna modules to operate as a composite antenna beamforming array to steer a composite beam.

Example 31 includes the subject matter of Example 30 and optionally, comprising configuring the plurality of time delays for generating the composite beam.

Example 32 includes the subject matter of any one of Examples 27-31 and optionally, comprising applying a cyclic delay to a signal in a frequency domain, the cyclic delay configured to result in the time delay in a time domain.

Example 33 includes the subject matter of any one of Examples 27-32 and optionally, comprising applying a time delay of the plurality of time delays by shifting a plurality of frequency-domain signals by a plurality of phase shifts.

Example 34 includes the subject matter of Example 33 and optionally, wherein the phase shifts are separated by a predefined phase shift value, which is based on the time delay.

Example 35 includes the subject matter of Example 34 and optionally, wherein the phase shift value is based on a baseband sampling rate and a number of the plurality of frequency-domain signals.

Example 36 includes the subject matter of any one of Examples 27-35 and optionally, comprising receiving the beamformed communication via the plurality of antenna modules.

Example 37 includes the subject matter of any one of Examples 27-35 and optionally, comprising transmitting the beamformed communication via the plurality of antenna modules.

Example 38 includes the subject matter of any one of Examples 27-37 and optionally, wherein the beamformed communication comprises an Orthogonal Frequency-Division Multiplexing (OFDM) communication.

Example 39 includes the subject matter of any one of Examples 27-37 and optionally, wherein the beamformed communication comprises a Single Carrier with Frequency Domain Equalization (SC-FDE) communication.

Example 40 includes the subject matter of any one of Examples 27-39 and optionally, wherein the beamformed communication comprises a communication over a millimeter wave (mmWave) frequency band or a Directional Multi-Gigabit (DMG) frequency band.

Example 41 includes a product including a non-transitory storage medium having stored thereon instructions that, when executed by a machine, result in processing a plurality of baseband signals, the processing including applying, in a frequency domain, a plurality of time delays to the plurality of a baseband signals to generate a plurality of delayed baseband signals in a time domain; and communicating a beamformed communication via a plurality of Radio Frequency (RF) beamforming antenna modules based on the plurality of delayed baseband signals.

Example 42 includes the subject matter of Example 41 and optionally, wherein the instructions result in converting the delayed baseband signals into a plurality of RF signals, and communicating the beamformed communication by communicating the plurality of RF signals via the plurality of RF beamforming antenna modules.

Example 43 includes the subject matter of Example 41 or 42 and optionally, wherein each RF beamforming antenna module includes an array of antenna elements coupled to a RF beamforming circuit, and wherein the instructions result in adjusting phase shifts to be applied to the antenna elements for forming a directional antenna beam.

Example 44 includes the subject matter of any one of Examples 41-43 and optionally, wherein the instructions result in controlling the plurality of antenna modules to operate as a composite antenna beamforming array to steer a composite beam.

Example 45 includes the subject matter of Example 44 and optionally, wherein the instructions result in configuring the plurality of time delays for generating the composite beam.

Example 46 includes the subject matter of any one of Examples 41-45 and optionally, wherein the instructions result in applying a cyclic delay to a signal in a frequency domain, the cyclic delay configured to result in the time delay in a time domain.

Example 47 includes the subject matter of any one of Examples 41-46 and optionally, wherein the instructions result in applying a time delay of the plurality of time delays by shifting a plurality of frequency-domain signals by a plurality of phase shifts.

Example 48 includes the subject matter of Example 47 and optionally, wherein the phase shifts are separated by a predefined phase shift value, which is based on the time delay.

Example 49 includes the subject matter of Example 48 and optionally, wherein the phase shift value is based on a baseband sampling rate and a number of the plurality of frequency-domain signals.

Example 50 includes the subject matter of any one of Examples 41-49 and optionally, wherein the instructions result in receiving the beamformed communication via the plurality of antenna modules.

Example 51 includes the subject matter of any one of Examples 41-49 and optionally, wherein the instructions result in transmitting the beamformed communication via the plurality of antenna modules.

Example 52 includes the subject matter of any one of Examples 41-51 and optionally, wherein the beamformed communication comprises an Orthogonal Frequency-Division Multiplexing (OFDM) communication.

Example 53 includes the subject matter of any one of Examples 41-51 and optionally, wherein the beamformed communication comprises a Single Carrier with Frequency Domain Equalization (SC-FDE) communication.

Example 54 includes the subject matter of any one of Examples 41-53 and optionally, wherein the beamformed communication comprises a communication over a millimeter wave (mmWave) frequency band or a Directional Multi-Gigabit (DMG) frequency band.

Example 55 includes an apparatus of wireless communication, the apparatus comprising means for processing a plurality of baseband signals, the processing including applying, in a frequency domain, a plurality of time delays to the plurality of a baseband signals to generate a plurality of delayed baseband signals in a time domain; and means for communicating a beamformed communication via a plurality of Radio Frequency (RF) beamforming antenna modules based on the plurality of delayed baseband signals.

Example 56 includes the subject matter of Example 55 and optionally, including means for converting the delayed baseband signals into a plurality of RF signals, and means for communicating the beamformed communication by communicating the plurality of RF signals via the plurality of RF beamforming antenna modules.

Example 57 includes the subject matter of any one of Examples 55-56 and optionally, wherein each RF beamforming antenna module includes an array of antenna elements coupled to a RF beamforming circuit, the apparatus comprising means for adjusting phase shifts to be applied to the antenna elements for forming a directional antenna beam.

Example 58 includes the subject matter of any one of Examples 55-57 and optionally, comprising means for controlling the plurality of antenna modules to operate as a composite antenna beamforming array to steer a composite beam.

Example 59 includes the subject matter of Example 58 and optionally, comprising means for configuring the plurality of time delays for generating the composite beam.

Example 60 includes the subject matter of any one of Examples 55-59 and optionally, comprising means for applying a cyclic delay to a signal in a frequency domain, the cyclic delay configured to result in the time delay in a time domain.

Example 61 includes the subject matter of any one of Examples 55-60 and optionally, comprising means for applying a time delay of the plurality of time delays by shifting a plurality of frequency-domain signals by a plurality of phase shifts.

Example 62 includes the subject matter of Example 61 and optionally, wherein the phase shifts are separated by a predefined phase shift value, which is based on the time delay.

Example 63 includes the subject matter of Example 62 and optionally, wherein the phase shift value is based on a baseband sampling rate and a number of the plurality of frequency-domain signals.

Example 64 includes the subject matter of any one of Examples 55-63 and optionally, wherein the antenna modules are to receive the beamformed communication.

Example 65 includes the subject matter of any one of Examples 55-63 and optionally, wherein the antenna modules are to transmit the beamformed communication.

Example 66 includes the subject matter of any one of Examples 55-65 and optionally, wherein the beamformed communication comprises an Orthogonal Frequency-Division Multiplexing (OFDM) communication.

Example 67 includes the subject matter of any one of Examples 55-65 and optionally, wherein the beamformed communication comprises a Single Carrier with Frequency Domain Equalization (SC-FDE) communication.

Example 68 includes the subject matter of any one of Examples 55-67 and optionally, wherein the beamformed communication comprises a communication over a millimeter wave (mmWave) frequency band or a Directional Multi-Gigabit (DMG) frequency band.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a baseband processor including a plurality of baseband processing chains to process signals to be communicated via a plurality of antenna modules of an antenna array, wherein said plurality of baseband processing chains include a respective plurality of frequency domain delay modules, a frequency domain delay module of said plurality of frequency domain delay modules is to apply a time delay to a signal to be communicated via an antenna module of said plurality of antenna modules, said frequency domain delay module is configured to shift a plurality of frequency components of the signal by a respective plurality of different phase shifts, the baseband processor comprising a controller that is to determine a phase shift of said plurality of phase shifts based on a multiple of a phase shift value, the phase shift value is based on said time delay.

2. The apparatus of claim 1, wherein said antenna module comprises an array of antenna elements coupled to a radio frequency (RF) beamforming circuit, said RF beamforming circuit is to adjust phase shifts to be applied to said antenna elements for forming a directional antenna beam.

3. The apparatus of claim 1 comprising a beamforming controller to control said plurality of antenna modules to operate as a composite antenna beamforming array to steer a composite beam.

4. The apparatus of claim 3, wherein said beamforming controller is to control a plurality of time delays applied by said plurality of frequency domain delay modules, said plurality of time delays configured for generating said composite beam.

5. The apparatus of claim 1, wherein said frequency domain delay module is to apply a cyclic delay to said signal in a frequency domain, said cyclic delay configured to result in said time delay in a time domain.

6. The apparatus of claim 1, wherein said phase shift value is based on a size of a Fast Fourier Transform (FFT) to convert between a frequency domain and a time domain.

7. The apparatus of claim 1, wherein said plurality of frequency components comprises a plurality of samples or a plurality of modulation symbols.

8. The apparatus of claim 1, wherein said phase shift value is based on a baseband sampling rate of said baseband processor and a number of said plurality of frequency components.

9. The apparatus of claim 1, wherein said baseband processor is to process said signals received via said plurality of antenna modules.

10. The apparatus of claim 1, wherein said baseband processor is to process said signals to be transmitted via said plurality of antenna modules.

11. The apparatus of claim 1, wherein said signals comprise Orthogonal Frequency-Division Multiplexing (OFDM) signals.

12. The apparatus of claim 1, wherein said signals comprise Single Carrier with Frequency Domain Equalization (SC-FDE) signals.

13. The apparatus of claim 1, wherein said plurality of antenna modules is to communicate said signals over a millimeter wave (mmWave) frequency band or a Directional Multi-Gigabit (DMG) frequency band.

14. A system comprising:
a wireless communication device including:
an antenna array including a plurality of antenna modules; and
a baseband processor including a plurality of baseband processing chains to process signals to be communicated via said plurality of antenna modules, wherein said plurality of baseband processing chains include a respective plurality of frequency domain delay modules, a frequency domain delay module of said plurality of frequency domain delay modules is to apply a time delay to a signal to be communicated via an antenna module of said plurality of antenna modules, said frequency domain delay module is configured to shift a plurality of frequency components of the signal by a respective plurality of different phase shifts, the baseband processor comprising a controller that is to determine a phase shift of said plurality of phase shifts based on a multiple of a phase shift value, the phase shift value is based on said time delay.

15. The system of claim 14, wherein said antenna module comprises an array of antenna elements coupled to a radio frequency (RF) beamforming circuit, said RF beamforming circuit is to adjust phase shifts to be applied to said antenna elements for forming a directional antenna beam.

16. The system of claim 14 comprising a beamforming controller to control said plurality of antenna modules to operate as a composite antenna beamforming array to steer a composite beam.

17. The system of claim 16, wherein said beamforming controller is to control a plurality of time delays applied by said plurality of frequency domain delay modules, said plurality of time delays configured for generating said composite beam.

18. The system of claim 14, wherein said frequency domain delay module is to apply a cyclic delay to said signal in a frequency domain, said cyclic delay configured to result in said time delay in a time domain.

19. The system of claim 14, wherein said phase shift value is based on a size of a Fast Fourier Transform (FFT) to convert between a frequency domain and a time domain.

20. The system of claim 14, wherein said plurality of frequency components comprises a plurality of samples or a plurality of modulation symbols.

21. The system of claim 14, wherein said phase shift value is based on a baseband sampling rate of said baseband processor and a number of said plurality of frequency components.

22. A method of wireless communication, the method comprising:
processing a plurality of baseband signals, said processing including applying, in a frequency domain, a plurality of time delays to said plurality of a baseband signals to generate a plurality of delayed baseband signals in a time domain, applying said plurality of time delays comprises applying a time delay of said plurality of time delays to a signal to be communicated via an antenna module of a plurality of Radio Frequency (RF) beamforming antenna modules by shifting a plurality of frequency components of the signal by a respective plurality of different phase shifts, a phase shift of said plurality of phase shifts is based on a multiple of a phase shift value, the phase shift value is based on said time delay; and
communicating a beamformed communication via said plurality of RF beamforming antenna modules based on the plurality of delayed baseband signals.

23. The method of claim 22 including converting said delayed baseband signals into a plurality of RF signals, and communicating the beamformed communication by communicating the plurality of RF signals via said plurality of RF beamforming antenna modules.

24. The method of claim 22 comprising controlling said plurality of RF beamforming antenna modules to operate as a composite antenna beamforming array to steer a composite beam.

25. The method of claim 22, wherein said phase shift value is based on a size of a Fast Fourier Transform (FFT) to convert between a frequency domain and a time domain.

26. A product including a non-transitory storage medium having stored thereon instructions that, when executed by a machine, result in:
  processing a plurality of baseband signals, said processing including applying, in a frequency domain, a plurality of time delays to said plurality of a baseband signals to generate a plurality of delayed baseband signals in a time domain, applying said plurality of time delays comprises applying a time delay of said plurality of time delays to a signal to be communicated via an antenna module of a plurality of Radio Frequency (RF) beamforming antenna modules by shifting a plurality of frequency components of the signal by a respective plurality of different phase shifts, a phase shift of said plurality of phase shifts is based on a multiple of a phase shift value, the phase shift value is based on said time delay; and
  communicating a beamformed communication via the plurality of RF beamforming antenna modules based on the plurality of delayed baseband signals.

27. The product of claim 26, wherein said instructions result in converting said delayed baseband signals into a plurality of RF signals, and communicating the beamformed communication by communicating the plurality of RF signals via said plurality of RF beamforming antenna modules.

28. The product of claim 26, wherein said instructions result in controlling said plurality of RF beamforming antenna modules to operate as a composite antenna beamforming array to steer a composite beam.

29. The product of claim 26, wherein said phase shift value is based on a size of a Fast Fourier Transform (FFT) to convert between a frequency domain and a time domain.

30. The product of claim 26, wherein said plurality of frequency components comprises a plurality of samples or a plurality of modulation symbols.

* * * * *